(12) United States Patent  (10) Patent No.: US 7,993,511 B2
Gilliam et al.  (45) Date of Patent: Aug. 9, 2011

(54) ELECTROCHEMICAL PRODUCTION OF AN ALKALINE SOLUTION USING $CO_2$

(75) Inventors: Ryan J. Gilliam, Campbell, CA (US); Valentin Decker, Menlo Park, CA (US); Nigel Antony Knott, Campbell, CA (US); Michael Kostowskyj, Campbell, CA (US); Bryan Boggs, Campbell, CA (US)

(73) Assignee: Calera Corporation, Los Gatos, CA (US)

( * ) Notice: Subject to any disclaimer, the term of this patent is extended or adjusted under 35 U.S.C. 154(b) by 0 days.

(21) Appl. No.: 12/617,005

(22) Filed: Nov. 12, 2009

(65) Prior Publication Data

US 2010/0084280 A1  Apr. 8, 2010

Related U.S. Application Data

(63) Continuation-in-part of application No. 12/541,055, filed on Aug. 13, 2009, which is a continuation-in-part of application No. 12/503,557, filed on Jul. 15, 2009.

(51) Int. Cl.
C25B 1/16  (2006.01)

(52) U.S. Cl. ........ 205/510; 205/514; 205/517; 204/252; 204/263

(58) Field of Classification Search .............. 205/510, 205/514, 517; 204/252, 263
See application file for complete search history.

(56) References Cited

U.S. PATENT DOCUMENTS

| | | |
|---|---|---|
| 1,678,345 A | 7/1928 | Mattison |
| 1,865,833 A | 7/1932 | Chesny |
| 1,897,725 A | 2/1933 | Gaus et al. |
| 2,304,391 A | 12/1942 | Zimmerman |
| 2,329,940 A | 9/1943 | Ponzer |
| 2,383,674 A | 8/1945 | Osborne |
| 2,458,039 A | 1/1949 | Wait |
| 2,606,839 A | 8/1952 | Evans |
| 2,934,419 A | 4/1960 | Cook |
| 2,967,807 A | 1/1961 | Osborne et al. |
| 3,046,152 A | 7/1962 | Tsuneyoshi |
| 3,120,426 A | 2/1964 | Crawford, Jr. |
| 3,165,460 A * | 1/1965 | Zang et al. .............. 204/634 |
| 3,179,579 A | 4/1965 | Gustave et al. |
| 3,196,092 A | 7/1965 | Beer |
| 3,202,522 A | 8/1965 | Chi-Sun Yang et al. |

(Continued)

FOREIGN PATENT DOCUMENTS

AU   2007100157   4/2007

(Continued)

OTHER PUBLICATIONS

Allen, L.M. 1992. Boron and Sulfur Isotopic Fractionation in the Coal Combustion System. A Thesis Submitted to the Faculty of the Department of Hydrology and Water Resources. The University of Arizona.

(Continued)

*Primary Examiner* — Arun S Phasge

(57) ABSTRACT

An electrochemical system comprising a cathode electrolyte comprising added carbon dioxide and contacting a cathode; and a first cation exchange membrane separating the cathode electrolyte from an anode electrolyte contacting an anode; and an electrochemical method comprising adding carbon dioxide into a cathode electrolyte separated from an anode electrolyte by a first cation exchange membrane; and producing an alkaline solution in the cathode electrolyte and an acid.

24 Claims, 11 Drawing Sheets

U.S. PATENT DOCUMENTS

| | | | |
|---|---|---|---|
| 3,350,292 A | 10/1967 | Weinberger et al. |
| 3,374,164 A | 3/1968 | Balej et al. |
| 3,420,775 A | 1/1969 | Cadwallader |
| 3,463,814 A | 8/1969 | Blanco et al. |
| 3,466,169 A | 9/1969 | Nowak et al. |
| 3,511,595 A | 5/1970 | Fuchs |
| 3,511,712 A | 5/1970 | Giner |
| 3,525,675 A | 8/1970 | Gaudin |
| 3,558,769 A | 1/1971 | Globus |
| 3,574,530 A | 4/1971 | Suriani et al. |
| 3,627,479 A | 12/1971 | Yee |
| 3,627,480 A | 12/1971 | Birchall |
| 3,630,762 A | 12/1971 | Olton et al. |
| 3,686,372 A | 8/1972 | Hiatt et al. |
| 3,725,267 A | 4/1973 | Gelblum |
| 3,861,928 A | 1/1975 | Slater et al. |
| 3,864,236 A | 2/1975 | Lindstrom |
| 3,904,496 A | 9/1975 | Harke et al. |
| 3,917,795 A | 11/1975 | Pelczarski et al. |
| 3,925,534 A | 12/1975 | Singleton et al. |
| 3,953,568 A | 4/1976 | Seko et al. |
| 3,963,592 A | 6/1976 | Lindstrom |
| 3,970,528 A | 7/1976 | Zirngiebl et al. |
| 4,026,716 A | 5/1977 | Urschel, III et al. |
| 4,036,749 A | 7/1977 | Anderson |
| 4,080,270 A | 3/1978 | O'Leary et al. |
| 4,106,296 A | 8/1978 | Leonard, Jr. et al. |
| 4,107,022 A | 8/1978 | Strempel et al. |
| 4,128,462 A | 12/1978 | Ghiringhelli et al. |
| 4,140,510 A | 2/1979 | Scholze et al. |
| 4,147,599 A | 4/1979 | O'Leary et al. |
| 4,164,537 A | 8/1979 | Drostholm et al. |
| 4,188,291 A | 2/1980 | Anderson |
| 4,217,186 A | 8/1980 | McRae |
| 4,242,185 A | 12/1980 | McRae |
| 4,246,075 A | 1/1981 | Hilbertz |
| 4,253,922 A | 3/1981 | Welch |
| 4,264,367 A | 4/1981 | Schutz |
| 4,308,298 A | 12/1981 | Chen |
| 4,335,788 A | 6/1982 | Murphey et al. |
| 4,361,475 A | 11/1982 | Moeglich |
| 4,370,307 A | 1/1983 | Judd |
| 4,376,101 A | 3/1983 | Sartori et al. |
| 4,410,606 A | 10/1983 | Loutfy et al. |
| 4,450,009 A | 5/1984 | Childs et al. |
| 4,477,573 A | 10/1984 | Taufen |
| 4,561,945 A | 12/1985 | Coker et al. |
| 4,588,443 A | 5/1986 | Bache |
| 4,620,969 A | 11/1986 | Wilkinson |
| 4,716,027 A | 12/1987 | Morrison |
| 4,804,449 A | 2/1989 | Sweeney |
| 4,818,367 A | 4/1989 | Winkler |
| 4,838,941 A | 6/1989 | Hill |
| 4,899,544 A | 2/1990 | Boyd |
| 4,915,914 A | 4/1990 | Morrison |
| 4,931,264 A | 6/1990 | Rochelle et al. |
| 5,037,286 A | 8/1991 | Roberts |
| 5,100,633 A | 3/1992 | Morrison |
| 5,230,734 A | 7/1993 | Kumasaka et al. |
| 5,244,304 A | 9/1993 | Weill et al. |
| 5,246,551 A | 9/1993 | Pletcher et al. |
| 5,282,935 A | 2/1994 | Cawlfield et al. |
| 5,362,688 A | 11/1994 | Porta et al. |
| 5,364,611 A | 11/1994 | Iijima et al. |
| 5,366,513 A | 11/1994 | Goldmann et al. |
| 5,388,456 A | 2/1995 | Kettel |
| 5,470,671 A | 11/1995 | Fletcher et al. |
| 5,520,898 A | 5/1996 | Pinnavaia et al. |
| 5,531,821 A | 7/1996 | Wu |
| 5,531,865 A | 7/1996 | Cole |
| 5,536,310 A | 7/1996 | Brook et al. |
| 5,547,027 A | 8/1996 | Chan et al. |
| 5,569,558 A | 10/1996 | Takeuchi et al. |
| 5,584,923 A | 12/1996 | Wu |
| 5,584,926 A | 12/1996 | Borgholm et al. |
| 5,595,641 A | 1/1997 | Traini et al. |
| 5,614,078 A | 3/1997 | Lubin et al. |
| 5,624,493 A | 4/1997 | Wagh et al. |
| 5,690,729 A | 11/1997 | Jones, Jr. |
| 5,702,585 A | 12/1997 | Hillrichs et al. |
| 5,766,338 A | 6/1998 | Weber |
| 5,766,339 A | 6/1998 | Babu et al. |
| 5,776,328 A | 7/1998 | Traini et al. |
| 5,785,868 A | 7/1998 | Li et al. |
| 5,803,894 A | 9/1998 | Kao et al. |
| 5,846,669 A | 12/1998 | Smotkin et al. |
| 5,849,075 A | 12/1998 | Hopkins et al. |
| 5,855,666 A | 1/1999 | Kao et al. |
| 5,855,759 A | 1/1999 | Keating et al. |
| 5,885,478 A | 3/1999 | Montgomery et al. |
| 5,897,704 A | 4/1999 | Baglin |
| 5,925,255 A | 7/1999 | Mukhopadhyay |
| 5,965,201 A | 10/1999 | Jones, Jr. |
| 6,024,848 A | 2/2000 | Dufner et al. |
| 6,059,974 A | 5/2000 | Scheurman, III |
| 6,071,336 A | 6/2000 | Fairchild et al. |
| 6,080,297 A | 6/2000 | Ayers |
| 6,090,197 A | 7/2000 | Vivian et al. |
| 6,129,832 A | 10/2000 | Fuhr et al. |
| 6,180,012 B1 | 1/2001 | Rongved |
| 6,190,428 B1 | 2/2001 | Rolison et al. |
| 6,200,381 B1 | 3/2001 | Rechichi |
| 6,200,543 B1 | 3/2001 | Allebach et al. |
| 6,217,728 B1 | 4/2001 | Lehmann et al. |
| 6,235,186 B1 | 5/2001 | Tanaka et al. |
| 6,248,166 B1 | 6/2001 | Solsvik |
| 6,251,356 B1 | 6/2001 | Mathur |
| 6,264,740 B1 | 7/2001 | McNulty, Jr. |
| 6,280,505 B1 | 8/2001 | Torkildsen et al. |
| 6,293,731 B1 | 9/2001 | Studer |
| 6,352,576 B1 | 3/2002 | Spencer et al. |
| 6,375,825 B1 | 4/2002 | Mauldin et al. |
| 6,387,212 B1 | 5/2002 | Christian |
| 6,402,831 B1 | 6/2002 | Sawara et al. |
| 6,416,574 B1 | 7/2002 | Steelhammer et al. |
| 6,444,107 B2 | 9/2002 | Hartel et al. |
| 6,475,460 B1 | 11/2002 | Max |
| 6,495,013 B2 | 12/2002 | Mazur et al. |
| 6,517,631 B1 | 2/2003 | Bland |
| 6,518,217 B2 | 2/2003 | Xing et al. |
| 6,537,456 B2 | 3/2003 | Mukhopadhyay |
| 6,602,630 B1 | 8/2003 | Gopal |
| 6,623,555 B1 | 9/2003 | Haverinen et al. |
| 6,638,413 B1 | 10/2003 | Weinberg et al. |
| 6,648,949 B1 | 11/2003 | Der et al. |
| 6,712,946 B2 | 3/2004 | Genders et al. |
| 6,755,905 B2 | 6/2004 | Oates et al. |
| 6,776,972 B2 | 8/2004 | Vohra et al. |
| 6,786,963 B2 | 9/2004 | Matherly et al. |
| 6,841,512 B1 | 1/2005 | Fetcenko et al. |
| 6,890,419 B2 | 5/2005 | Reichman et al. |
| 6,890,497 B2 | 5/2005 | Rau et al. |
| 6,908,507 B2 | 6/2005 | Lalande et al. |
| 6,936,573 B2 | 8/2005 | Wertz et al. |
| 7,037,434 B2 | 5/2006 | Myers et al. |
| 7,040,400 B2 | 5/2006 | de Rouffignac et al. |
| 7,132,090 B2 | 11/2006 | Dziedzic et al. |
| 7,135,604 B2 | 11/2006 | Ding et al. |
| 7,198,722 B2 | 4/2007 | Hussain |
| 7,255,842 B1 | 8/2007 | Yeh et al. |
| 7,261,912 B2 | 8/2007 | Zeigler |
| 7,282,189 B2 | 10/2007 | Zauderer |
| 7,285,166 B2 | 10/2007 | Luke et al. |
| 7,314,847 B1 | 1/2008 | Siriwardane |
| 7,347,896 B2 | 3/2008 | Harrison |
| 7,390,444 B2 | 6/2008 | Ramme et al. |
| 7,427,449 B2 | 9/2008 | Delaney et al. |
| 7,440,871 B2 | 10/2008 | McConnell et al. |
| 7,452,449 B2 | 11/2008 | Weinberg et al. |
| 7,455,854 B2 | 11/2008 | Gower et al. |
| 7,595,001 B2 | 9/2009 | Arakel et al. |
| 7,674,443 B1 | 3/2010 | Davis |
| 7,790,012 B2 | 9/2010 | Kirk et al. |
| 7,875,163 B2 | 1/2011 | Gilliam et al. |
| 7,887,694 B2 | 2/2011 | Constantz et al. |
| 2001/0022952 A1 | 9/2001 | Rau et al. |
| 2001/0023655 A1 | 9/2001 | Knopf et al. |

| | | |
|---|---|---|
| 2001/0054253 A1 | 12/2001 | Takahashi et al. |
| 2002/0009410 A1 | 1/2002 | Mathur |
| 2002/0127474 A1 | 9/2002 | Fleischer et al. |
| 2003/0017088 A1 | 1/2003 | Downs et al. |
| 2003/0027023 A1 | 2/2003 | Dutil et al. |
| 2003/0123930 A1 | 7/2003 | Jacobs et al. |
| 2003/0126899 A1 | 7/2003 | Wolken |
| 2003/0188668 A1 | 10/2003 | Bland |
| 2003/0213937 A1 | 11/2003 | Yaniv |
| 2003/0229572 A1 | 12/2003 | Raines et al. |
| 2004/0014845 A1 | 1/2004 | Takamura et al. |
| 2004/0040671 A1 | 3/2004 | Duesel, Jr. et al. |
| 2004/0040715 A1 | 3/2004 | Wellington et al. |
| 2004/0052865 A1 | 3/2004 | Gower et al. |
| 2004/0111968 A1 | 6/2004 | Day et al. |
| 2004/0126293 A1 | 7/2004 | Geerlings et al. |
| 2004/0139891 A1 | 7/2004 | Merkley et al. |
| 2004/0213705 A1 | 10/2004 | Blencoe et al. |
| 2004/0219090 A1 | 11/2004 | Dziedzic et al. |
| 2004/0224214 A1 | 11/2004 | Vamos et al. |
| 2004/0228788 A1 | 11/2004 | Nagai et al. |
| 2004/0231568 A1 | 11/2004 | Morioka et al. |
| 2004/0234443 A1 | 11/2004 | Chen et al. |
| 2004/0259231 A1 | 12/2004 | Bhattacharya |
| 2004/0267077 A1 | 12/2004 | Ding et al. |
| 2005/0002847 A1 | 1/2005 | Maroto-Valer et al. |
| 2005/0011770 A1 | 1/2005 | Katsuyoshi et al. |
| 2005/0031522 A1 | 2/2005 | Delaney et al. |
| 2005/0036932 A1 | 2/2005 | Takahashi et al. |
| 2005/0087496 A1 | 4/2005 | Borseth |
| 2005/0098499 A1 | 5/2005 | Hussain |
| 2005/0118081 A1 | 6/2005 | Harris et al. |
| 2005/0129606 A1 | 6/2005 | Mitsuhashi et al. |
| 2005/0136310 A1 | 6/2005 | Luo et al. |
| 2005/0154669 A1 | 7/2005 | Streetman |
| 2005/0180910 A1 | 8/2005 | Park et al. |
| 2005/0232855 A1 | 10/2005 | Stevens et al. |
| 2005/0232856 A1 | 10/2005 | Stevens et al. |
| 2005/0238563 A1 | 10/2005 | Eighmy et al. |
| 2005/0255174 A1 | 11/2005 | Shelley et al. |
| 2006/0048517 A1 | 3/2006 | Fradette et al. |
| 2006/0051274 A1 | 3/2006 | Wright et al. |
| 2006/0057036 A1 | 3/2006 | Ayala Hermosillo |
| 2006/0060532 A1 | 3/2006 | Davis |
| 2006/0105082 A1 | 5/2006 | Zeigler |
| 2006/0165583 A1 | 7/2006 | Makino et al. |
| 2006/0169177 A1 | 8/2006 | Jardine et al. |
| 2006/0169593 A1 | 8/2006 | Xu et al. |
| 2006/0173169 A1 | 8/2006 | Cheryan |
| 2006/0184445 A1 | 8/2006 | Sandor et al. |
| 2006/0185516 A1 | 8/2006 | Moriyama et al. |
| 2006/0185560 A1 | 8/2006 | Ramme et al. |
| 2006/0185985 A1* | 8/2006 | Jones .......................... 205/508 |
| 2006/0195002 A1 | 8/2006 | Grandjean et al. |
| 2006/0196836 A1 | 9/2006 | Arakel et al. |
| 2006/0286011 A1 | 12/2006 | Anttila et al. |
| 2006/0288912 A1 | 12/2006 | Sun et al. |
| 2007/0045125 A1 | 3/2007 | Hartvigsen et al. |
| 2007/0056487 A1 | 3/2007 | Anthony et al. |
| 2007/0092427 A1 | 4/2007 | Anthony et al. |
| 2007/0099038 A1 | 5/2007 | Galloway |
| 2007/0113500 A1 | 5/2007 | Zhao |
| 2007/0148509 A1 | 6/2007 | Colbow et al. |
| 2007/0163443 A1 | 7/2007 | Moriyama et al. |
| 2007/0186820 A1 | 8/2007 | O'Hearn |
| 2007/0187247 A1 | 8/2007 | Lackner et al. |
| 2007/0202032 A1 | 8/2007 | Geerlings et al. |
| 2007/0212584 A1 | 9/2007 | Chuang |
| 2007/0217981 A1 | 9/2007 | Van Essendelft |
| 2007/0240570 A1 | 10/2007 | Jadhav et al. |
| 2007/0261947 A1 | 11/2007 | Geerlings et al. |
| 2007/0266632 A1 | 11/2007 | Tsangaris et al. |
| 2008/0031801 A1 | 2/2008 | Lackner et al. |
| 2008/0059206 A1 | 3/2008 | Jenkins |
| 2008/0112868 A1 | 5/2008 | Blencoe et al. |
| 2008/0138265 A1 | 6/2008 | Lackner et al. |
| 2008/0171158 A1 | 7/2008 | Maddan |
| 2008/0178739 A1 | 7/2008 | Lewnard et al. |
| 2008/0223727 A1 | 9/2008 | Oloman et al. |
| 2008/0236143 A1 | 10/2008 | Lo |
| 2008/0245274 A1 | 10/2008 | Ramme |
| 2008/0245660 A1 | 10/2008 | Little et al. |
| 2008/0245672 A1 | 10/2008 | Little et al. |
| 2008/0248350 A1 | 10/2008 | Little et al. |
| 2008/0270272 A1 | 10/2008 | Branscomb |
| 2008/0275149 A1 | 11/2008 | Ladely et al. |
| 2008/0276553 A1 | 11/2008 | Ingjaldsdottir et al. |
| 2008/0277319 A1 | 11/2008 | Wyrsta |
| 2008/0289495 A1 | 11/2008 | Eisenberger et al. |
| 2009/0001020 A1 | 1/2009 | Constantz et al. |
| 2009/0010827 A1 | 1/2009 | Geerlings et al. |
| 2009/0020044 A1 | 1/2009 | Constantz et al. |
| 2009/0043687 A1 | 2/2009 | van Soestbergen et al. |
| 2009/0081093 A1 | 3/2009 | Comrie |
| 2009/0081096 A1 | 3/2009 | Pellegrin |
| 2009/0090277 A1 | 4/2009 | Joshi et al. |
| 2009/0120644 A1 | 5/2009 | Roddy et al. |
| 2009/0143211 A1 | 6/2009 | Riman et al. |
| 2009/0148238 A1 | 6/2009 | Smith |
| 2009/0169452 A1 | 7/2009 | Constantz et al. |
| 2009/0186244 A1 | 7/2009 | Mayer |
| 2009/0202410 A1 | 8/2009 | Kawatra et al. |
| 2009/0214408 A1 | 8/2009 | Blake et al. |
| 2009/0232861 A1 | 9/2009 | Wright et al. |
| 2009/0263301 A1 | 10/2009 | Reddy et al. |
| 2009/0294366 A1 | 12/2009 | Wright et al. |
| 2009/0301352 A1 | 12/2009 | Constantz et al. |
| 2010/0024686 A1 | 2/2010 | Constantz et al. |
| 2010/0051859 A1 | 3/2010 | House et al. |
| 2010/0063902 A1 | 3/2010 | Constantz et al. |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0089142 A1 | 4/2010 | Sukhija et al. |
| 2010/0111810 A1 | 5/2010 | Constantz et al. |
| 2010/0116683 A1 | 5/2010 | Gilliam |
| 2010/0132556 A1 | 6/2010 | Constantz et al. |
| 2010/0135865 A1 | 6/2010 | Constantz et al. |
| 2010/0135882 A1 | 6/2010 | Constantz et al. |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |
| 2010/0200419 A1 | 8/2010 | Gilliam et al. |
| 2010/0230293 A1 | 9/2010 | Gilliam et al. |
| 2011/0036728 A1 | 2/2011 | Farsad et al. |
| 2011/0042230 A1 | 2/2011 | Gilliam et al. |

FOREIGN PATENT DOCUMENTS

| | | |
|---|---|---|
| AU | 2008256636 B2 | 12/2008 |
| CA | 1335974 A1 | 6/1995 |
| CA | 2646462 | 9/2007 |
| DE | 2653649 A1 | 6/1978 |
| DE | 3146326 A1 | 6/1983 |
| DE | 3638317 A1 | 6/1987 |
| DE | 19523324 A1 | 9/1994 |
| DE | 19512163 A1 | 10/1995 |
| DE | 19631794 A1 | 8/1997 |
| EP | 0522382 A1 | 1/1993 |
| EP | 0487102 B1 | 8/1995 |
| EP | 0591350 B1 | 11/1996 |
| EP | 0628339 B1 | 9/1999 |
| EP | 0844905 B1 | 3/2000 |
| EP | 1379469 B1 | 3/2006 |
| EP | 1650162 A1 | 4/2006 |
| EP | 1716911 A1 | 11/2006 |
| EP | 1554031 B1 | 12/2006 |
| EP | 1571105 B1 | 12/2007 |
| GB | 911386 A | 11/1962 |
| GB | 1392907 | 5/1975 |
| GB | 2032441 | 5/1980 |
| GB | 2210035 A | 6/1989 |
| GB | 2371810 | 8/2002 |
| JP | 51102357 A1 | 9/1976 |
| JP | 59100280 | 6/1984 |
| JP | 1142093 | 11/1987 |
| JP | 63-312988 A2 | 12/1988 |
| JP | 03-020491 A2 | 1/1991 |
| JP | 03-170363 A | 7/1991 |

| | | |
|---|---|---|
| JP | 7061842 A | 3/1995 |
| JP | 10305212 A | 11/1998 |
| JP | 2002-273163 A | 9/2002 |
| JP | 2003041388 | 2/2003 |
| JP | 2004-174370 | 6/2004 |
| JP | 2005-052762 | 3/2005 |
| JP | 2006-076825 | 3/2006 |
| NL | 7607470 A | 1/1978 |
| WO | WO 93/16216 A1 | 8/1993 |
| WO | WO 94/18119 | 8/1994 |
| WO | WO 96/34997 A1 | 11/1996 |
| WO | WO 99/13967 A1 | 3/1999 |
| WO | WO 2006/009600 A2 | 1/2000 |
| WO | WO 01/07365 A1 | 2/2001 |
| WO | WO 01/96243 A1 | 12/2001 |
| WO | WO 02/00551 A2 | 1/2002 |
| WO | WO 03/008071 A1 | 1/2003 |
| WO | WO 03/054508 A2 | 7/2003 |
| WO | WO 03/068685 A1 | 8/2003 |
| WO | WO 2004/041731 A1 | 5/2004 |
| WO | WO 2004/094043 A2 | 11/2004 |
| WO | WO 2004/098740 A2 | 11/2004 |
| WO | WO 2005/028379 A1 | 3/2005 |
| WO | WO 2005/078836 A2 | 8/2005 |
| WO | WO 2005/086843 A2 | 9/2005 |
| WO | WO 2005/108297 A2 | 11/2005 |
| WO | WO 2006/034339 A1 | 3/2006 |
| WO | WO 2006/036396 A2 | 4/2006 |
| WO | WO 2006/099599 A2 | 9/2006 |
| WO | WO 2006/134080 A1 | 12/2006 |
| WO | WO 2007/003013 A1 | 1/2007 |
| WO | WO 2007/016271 A2 | 2/2007 |
| WO | WO 2007/060149 A1 | 5/2007 |
| WO | WO 2007/069902 A1 | 6/2007 |
| WO | WO 2007/071633 A1 | 6/2007 |
| WO | WO 2007/082505 A2 | 7/2007 |
| WO | WO 2007/094691 A1 | 8/2007 |
| WO | WO 2007/096671 A1 | 8/2007 |
| WO | WO 2007/106372 A2 | 9/2007 |
| WO | WO 2007/106883 A2 | 9/2007 |
| WO | WO 2007/123917 A2 | 11/2007 |
| WO | WO 2007/139392 A1 | 12/2007 |
| WO | WO 2007/140544 A1 | 12/2007 |
| WO | WO 2007/142945 A2 | 12/2007 |
| WO | WO 2008/018928 A2 | 2/2008 |
| WO | WO 2008/026201 A2 | 3/2008 |
| WO | WO 2008/031834 A1 | 3/2008 |
| WO | WO 2008/061305 A1 | 5/2008 |
| WO | WO 2008/068322 A1 | 6/2008 |
| WO | WO 2008/089523 A1 | 7/2008 |
| WO | WO 2008/095057 A2 | 8/2008 |
| WO | WO 2008/101293 A1 | 8/2008 |
| WO | WO 2008/108657 A1 | 9/2008 |
| WO | WO 2008/115662 A2 | 9/2008 |
| WO | WO 2008/124538 A1 | 10/2008 |
| WO | WO 2008/140821 A2 | 11/2008 |
| WO | WO 2008/142017 A2 | 11/2008 |
| WO | WO 2008/142025 A2 | 11/2008 |
| WO | WO 2008/151060 A1 | 12/2008 |
| WO | WO 2009/006295 A2 | 1/2009 |
| WO | WO 2009/024826 A1 | 2/2009 |
| WO | WO 2009/032331 A2 | 3/2009 |
| WO | WO 2009/036087 A1 | 3/2009 |
| WO | WO 2009/039655 A1 | 4/2009 |
| WO | WO 2009/049085 A2 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/146436 A1 | 12/2009 |
| WO | WO 2010/006242 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/093716 A1 | 8/2010 |

OTHER PUBLICATIONS

Avery, G.B. et al. 2006. Carbon isotopic characterization of dissolved organic carbon in rainwater: Terrestrial and marine influences. *Science Direct*. 40(39): 7539-7545. Retrieved from the internet on May 20, 2010.

Baer, D.S., et al. 2002. Sensitive absorption measurements in the near-infrared region using off-axis integrated-cavity-output spectroscopy. *Appl. Phys. B*. 5 pages.

Biello, D. Cement from CO2: A Concrete Cure for Global Warming? *Scientific American* Aug. 7, 2008., pp. 1-3 [online] [retrieved on Dec. 29, 2009] <URL: http://www.scientificamerican.com/article.cfm>.

Biennier, L., et al. 2004. Multiplex integrated cavity output spectroscopy of cold PAH cations. *Chemical Physics Letters*. 387: 287-294.

Bottomley, D.J. et al. 1999. The origin and evolution of Canadian Shield brines: evaporation or freezing of seawater? New lithium isotope and geochemical evidence from the Slave craton. *Chemical Geology*. 155: 295-320.

Carbon Sequestration. National Energy Technology Laboratory, Jul. 1, 2008 (online) [retrieved on Dec. 21, 2009] <URL: http://web.archive.org/web/20080701213124/http://www.netl.doe.gov/technologies/carbon_seq/index.html>.

Cerling, T.E. 1984. The stable isotopic composition of modern soil carbonate and its relationship to climate. *Earth and Planetary Science Letters*. 71: 229-240.

Christensen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on 2009-12-30] <URL: http://pubs.acs.org/doi/abs/10.1021/ac071040p>.

Criss, R.E. 1995. Stable Isotope Distribution: Variations from Temperature, Organic and Water-Rock Interactions. Washington University, St. Louis, Department of Earch and Planetary Sciences. *American Geophysical Union*. pp. 292-307.

Dickens, A. et al. 2004. Reburial of fossil organic carbon in marine sediments. *Nature*. 427: 336-339. Retrieved from the internet on May 20, 2010.

Ehleringer, J.R., et al. 2002. Stable Isotopes. vol. 2, The Earth System: biological and ecological dimensions of global environmental change. pp. 544-550. Edited by Professor Harold A. Mooney and Dr. Josep G. Canadell in Encyclopedia of Global Environmental Change. John Wiley & Sons, Ltd. Chichester.

Elswick, E.R., et al. 2007. Sulfur and carbon isotope geochemistry of coal and derived coal-combustion by-products: An example from an Eastern Kentucky mine and power plant. *Applied Geochemistry*. 22: 2065-2077.

Fallick, A.E., et al. 1991. A Stable Isotope Study of the Magnesite Deposits Associated with the Alpine-Type Ultramafic Rocks of Yugoslavia. *Economic Geology*. 86: 847-861.

Faure, et al. 1963. The Isotopic Composition of Strontium in Oceanic and Continental Basalts: Application to the Origin of Igneous Rocks. *Journal of Petrology*. 4(1): 31-50. (abstract only). Http://petrology.oxfordjournals.org/cgi/content/abstract/4/1/31 (retrieved on Jun. 1, 2010).

Filley, T.R. et al. 1997. Application of Isotope-Ratio-Monitoring Gas Chromatography/Mass Spectrometry to Study Carbonization Reactions of FCCU Slurry Oils. Department of Geosciences, Department of Materials Science and Engineering, The Pennsylvania State University, University Park, PA. Abstracts of Papers of the American Chemical Society. 214:65-FUEL Part 1. pp. 938-941.

Fouke, B.W., et al. 2000. Depositional Facies and Aqueous-Solid Geochemistry of Travertine-Depositing Hot Springs (Angel Terrace, Mammoth Hot Springs, Yellowstone National Park, U.S.A.). *Journal of Sedimentary Research*. 70(3): 565-585.

Holdgate, G.R., et al. 2009. Eocene-Miocene carbon-isotope and floral record from brown coal seams in the Gippsland Basin of southeast Australia. *Global and Planetary Change*. 65: 89-103.

Horkel, K., et al. 2009. Stable isotopic composition of cryptocrystalline magnesite from deposits in Turkey and Austria. *Geophysical Research Abstracts*. 11. (abstract only).

Horner, G. et al. 2004. Isotope selective analysis of CO2 with tunable diode laser (TDL) spectroscopy in the NIR. *The Analyst*. 129: 772-778.

Huijgen, W.J.J., et al. 2005. Mineral CO2 Sequestration by Steel Slag Carbonation. *Environ. Sci. Technol*. 39: 9676-9682.

Huijgen, W.J.J., et al. 2006. Energy Consumption and Net CO2 Sequestration of Aqueous Mineral Carbonation. *Ind. Eng. Chem. Res.* 45: 9184-9194.

Huntzinger, D.N. et al. 2009. A life-cycle assessment of Portland cement manufacturing: comparing the traditional process with alternative technologies. *Journal of Cleaner Production*. 17: 668-675.

Huntzinger, D.N. Carbon Dioxide Sequestration in Cement Kiln Dust Through Mineral Carbonation. Michigan Technological University, 2006 [online], [retrieved on Dec. 29, 2009]. <URL: http://www.geo.mtu.edu/~dnhuntzi/DNHuntzingerETD.pdf>.

International Search Report dated Mar. 3, 2010 of EP08867440.3.
International Search Report dated May 6, 2010 of EP09716193.9.
International Search Report dated Jun. 22, 2010 of EP08772151.0.
International Search Report dated Jan. 4, 2010 of PCT/US09/062795.
International Search Report dated Jan. 13, 2010 of PCT/US09/059135.
International Search Report dated Feb. 2, 2010 of PCT/US09/059141.
International Search Report dated Feb. 24, 2010 of PCT/US09/067764.
International Search Report dated Mar. 10, 2010 of PCT/US10/022935.
International Search Report dated May 21, 2010 of PCT/US09/064117.

"Isotopic Signature", Wikipedia (2010), http://en.wikipedia.org/wiki/Isotopic_signature, Apr. 14, 2009, 3 pp.

Lin, C. et al. Use of Cement Kiln Dust, Fly Ash, and Recycling Technique in Low-Volume Road Rehabilitation. Transportation Research Record, 1992, No. 1345, pp. 19-27 (abstract) [online], [retrieved on Dec. 31, 2009] <URL: http://pubsindex.trb.org/view.aspx?id=370714>.

McCrea, J.M. 1950. On the Isotopic Chemistry of Carbonates and a Paleotemperature Scale. *The Journal of Chemical Physics*. 18(6): 849-857.

Melezhik, V.A., et al. 2001. Palaeproterozoic magnesite: lithological and isotopic evidence for playa/sabkha environments. *Sedimentology*. 48: 379-397.

Mihalcea, R.M., et al. 1998. Diode-laser absorption measurements of $CO_2$ near 2.0 μm at elevated temperatures. *Applied Optics*. 37(36): 8341-8347.

Miljevic, N., et al. 2007. Potential Use of Environmental Isotopes in Pollutant Migration Studies. *Environmental Isotopes in Pollutant Studies*. 58: 251-262.

Mook, W.G., et al. 1968. Isotopic Equilibrium between Shells and Their Environment. *Science*. 159(3817): 874-875.

Mook, W.G., et al. 1974. Carbon Isotope Fractionation Between Dissolved Bicarbonate and Gaseous Carbon Dioxide. 22:169-176.

Mottana, A. et al. 1979. Der grosse Mineralienfuhrer, BLV Verlagsgese1 1schaft mbH, Munchen, XP002577921, p. 194. (In German with English Translation).

Noda, H., et al. 1990. Electrochemical Reduction of Carbon Dioxide at Various Metal Electrodes in Aqueous Potassium Hydrogen Carbonate Solution. *The Chemical Society of Japan*. 63: 2459-2462.

O'Neil, J.R., et al. 1971. C13 and O18 compositions in some freshwater carbonates associated with ultramafic rocks and serpentines: western United States*. *Geochimica et Cosmochimica Acta*. 35: 687-697.

Philp, R.P. 2007. The emergence of stable isotopes in environmental and forensic geochemistry studies: a review. *Environ Chem Lett*. 5:57-66.

Portier et al. 2005. Modelling CO2 solubility in pure water and NaCl-type waters from 0 to 300 ° C and from 1 to 300 bar Application to the Utsira Formation at Sleipner. *Chemical Geology*. 217: 187-199.

Power, I.M., et al. 2007. Biologically induced mineralization of dypingite by cyanobacteria from an alkaline wetland near Atlin, British Columbia, Canada. *Geochemical Transactions*. 8: 16 pages.

Quay, P.D., et al. 1992. Oceanic Uptake of Fossil Fuel Co$_2$$: Carbon-13 Evidence. *Science*. 256 (5053): 74-79.

Saad, N. et al. 2009. Measurement of Isotopic CO2 in Dissolved Inorganic Carbons of Water Samples from Various Origins Using Wavelength-Scanned Cavity Ring-Down Spectrophotometer. *Geophysical Research Abstracts*. 11. (abstract only).

Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2010] <URL: http://www.agu.org/pubs/crossref/2008/2007JC004217.shtml>.

Schwab, E. 2004. Calciumhydroxid, XP-002577920. Retrieved from the Internet: <URL:http://www.roempp.com/prod/index1.html> (In German with English Translation).

Schouten, S., et al. 2004. Stable Carbon Isotopic Fractionations Associated with Inorganic Carbon Fixation by Anaerobic Ammonium-Oxidizing Bacteria. *Applied and Environmental Microbiology*. 70(6): 3785-3788.

Schroll, E. 2002. Genesis of magnesite deposits in the view of isotope geochemistry. *Boletim Paranaense de Geociencias*. 50: 59-68.

Sheppard, S.M.F., et al. 1970. Fractionation of Carbon and Oxygen Isotopes and Magnesium between Coexisting Metamorphic Calcite and Dolomite. *Contr. Mineral. And Petrol*. 26. 161-198.

Sethi, S. et al. 2006. Existing & Emerging Concentrate Minimization & Disposal Practices for Membrane Systems. *Florida Water Resources Journal*. pp. 38, 40, 42, 44, 46, 48.

Sial, A.N., et al. 2000. Carbon isotope fluctuations in Precambrian carbonate sequences of several localities in Brazil. *An. Acad. Bras. Ci*. 72(4): 539-558.

Stanley, S.M., et al. 2002. Low-magnesium calcite produced by coralline algae in seawater of Late Cretaceous composition. *PNAS*. 99(24): 15323-15326.

U.S. Appl. No. 12/126,776, filed May 23, 2008, Constantz, Brent R., et al, Non-Final Office Action dated Feb. 25, 2010; 21 pp.
U.S. Appl. No. 12/163,205, filed Jun. 27, 2008, Constantz, Brent R., et al, Non-Final Office Action dated Jan. 27, 2010.
U.S. Appl. No. 12/163,205, filed Jun. 27, 2008, Constantz, Brent R., et al, Non-Final Office Action dated Mar. 1, 2010.
U.S. Appl. No. 12/163,205, filed Jun. 27, 2008, Constantz, Brent R., et al, Non-Final Office Action dated Mar. 25, 2010.
U.S. Appl. No. 12/344,019, filed Dec. 24, 2008, Constantz, Brent R., et al, Non-Final Office Action dated Nov. 16, 2009.
U.S. Appl. No. 12/344,019, filed Dec. 24, 2008, Constantz, Brent R., et al, Non-Final Office Action dated Mar. 11, 2010.
U.S. Appl. No. 12/375,632, filed Mar. 5, 2009, Kirk, Donald W. et al, Non-Final Office Action dated Mar. 19, 2010.
U.S. Appl. No. 12/475,378, filed May 29, 2009, Constantz Brent. et al, Final Office Action dated May 5, 2010.
U.S. Appl. No. 12/475,378, filed May 29, 2009, Constantz Brent. et al, Non-Final Office Action dated Mar. 17, 2010.
U.S. Appl. No. 12/475,378, filed May 29, 2009, Constantz Brent. et al, Non-Final Office Action dated Mar. 2, 2010.
U.S. Appl. No. 12/486,692, filed Jun. 17, 2009, Constantz Brent. et al, Final Office Action dated May 3, 2010.
U.S. Appl. No. 12/486,692, filed Jun. 17, 2009, Constantz Brent. et al, Non-Final Office Action dated Mar. 23, 2010.
U.S. Appl. No. 12/486,692, filed Jun. 17, 2009, Constantz Brent. et al, Non-Final Office Action dated Mar. 1, 2010.
U.S. Appl. No. 12/501,217, filed Jul. 10, 2009, Constantz Brent et al, Non-Final Office Action dated Mar. 12, 2010.
U.S. Appl. No. 12/557,492, filed Sep. 10, 2009, Constantz, Brent R., et al. Non-Final Office Action dated May 6, 2010.
U.S. Appl. No. 12/604,383, filed Oct. 22 2009, Constantz Brent R. et al, Non-Final Office Action dated Apr. 5, 2010.
U.S. Appl. No. 12/604,383, filed Oct. 22 2009, Constantz Brent R. et al, Final Office Action dated Jun. 11, 2010.
U.S. Appl. No. 12/571,398, filed Sep. 30, 2009, Constantz Brent R. et al, Non-Final Office Action dated May 3, 2010.
U.S. Appl. No. 12/609,491, filed Oct. 30, 2009, Constantz Brent. et al, Non-Final Office Action dated Mar. 31, 2010.

Vagin, S.P., et al. 1979. Measurement of the Temperature of Gas Media Containing Carbon Dioxide by the Laser-Probing Method. *Plenum*.

Wang, W., et al. 2005. Effects of biodegradation on the carbon isotopic composition of natural gas—A case study in the bamianhe oil field of the Jiyang Depression, Eastern China. *Geochemical Journal*. 39(4): 301-309. (abstract) [online] [retrieved on Dec. 29, 2009] <URL: http://www/jstage.jst.go.jp/article/geochemj/39/4/39_301/_article> ab.

Webber, M.E., et al. 2001. In situ combustion measurements of CO2 by use of a distributed-feedback diode-laser sensor near 2.0 μm. *Applied Optics.* 40(6): 821-828.

Wen-Zhi et al., "Using Electrolytic Method to Promote CO2 Sequestration in Serpentine by Mineral Carbonation"; Journal of China University of Mining and Technology; vol. 36, No, 6; Nov. (2007) (Publication and English Translation).

Wilson, S.A., et al. 2009. Carbon Dioxide Fixation within Mine Wastes of Ultramafic-Hosted Ore Deposits: Examples from the Clinton Creek and Cassiar Chrysotile Deposits, Canada. *Society of Economic Geologists, Inc.* 104: 95-112.

Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL: http://www.anl.gov/PCS/acsfuel/preprint%20archive/Files/33_1_TORONTO_06-88_0114.PDF>.

Zedef, V., et al. 2000. Genesis of Vein Stockwork and Sedimentary Magnesite and Hydromagnesite Deposits in the Ultramafic Terranes of Southwestern Turkey: A Stable Isotope Study. 95: 429-446.

Aker, "Aker Clean Carbon, Carbon Capture Solutions Provider" Aker Clean Carbon Presentation for UN's IPCC; Jan. 24 (2008); 8pp.

Alexander, G. et al., "Evaluation of reaction variables in the dissolution of serpentine for mineral carbonation"; Elsevier; ScienceDirect Fuel 86 (2007) 273-281.

Back, M. et al.,"Reactivity of Alkaline Lignite Fly Ashes Towards CO in Water." Environmental Science & Technology. vol. 42, No. 12 (2008) pp. 4520-4526.

Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.

"Biomass Burning: A Hot Issue in Global Change." National Aeronautics and Space Administration. Langley Research Center, Hampton, Virginia. Fact Sheet FS-2001-02-56-LaRC. Feb. 2001. 4 pages.

Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.

Bond, G.M., et al. 2002. Brines as possible cation sources for biomimetic carbon dioxide sequestration. *American Geophysical Union* Abstract #U22A-07.

Cannell, M.G.R. 2003. "Carbon sequestration and biomass energy offset: theoretical, potential and achievable capacities globally, in Europe and the UK." Biomass and Bioenergy. 24: 97-116.

CICCS "Aims and Research"; www.nottingham.ac.uk/carbonmanagement/ccs_aims.php 2pp Aug. 3 (2007).

Druckenmiller et al., "Carbon sequestration using brine of adjusted pH to form mineral carbonates"; Elsevier; www.elsevier.com/locate/fuproc; Fuel Processing Technology 86 (2005) 1599-1614.

"Electrochemical cell", Wikepedia (2009), http:en.wiipedia.org/wiki/Electrochemical_Cell, Nov. 24, 2009, 5 pp.

Faverjon, F. et al. 2005. Electrochemical study of a hydrogen diffusion anode-membrane assembly for membrane electrolysis. *Electrochimica Acta* 51 (3): 386-394.

Faverjon, F. et al. 2006. Regeneration of hydrochloric acid and sodium hydroxide from purified sodium chloride by membrane electrolysis using a hydrogen diffusion anode-membrane assembly. Journal of Membrane Science 284 (1-2): 323-330.

Gain, E. et al. 2002. Ammonium nitrate wastewater treatment by coupled membrane electrolysis and electrodialysis. *Journal of Applied Electrochemistry* 32: 969-975.

Genders, D. 1995. Electrochemical Salt Splitting. http://www.electrosynthesis.com/news/mwatts.html (accessed Feb. 5, 2009).

Goldberg et al., "CO2 Mineral Sequestration Studies in US"; National Energy Technology Laboratory; goldberg@netl.doe.gov; 10pp.

Graff "Just Catch—CO2 Capture Technology" Aker Kvaerner; Pareto Clean Energy Tech Seminar Oct. 11, 2007 25pp.

Green Car Congress "PKU Researchers Carry Out Aqueous Fischer-Tropsch Reaction for First Time"; www.greeencarcongress.com/2007/12/pku-researchers.html; Dec. 12, 2007; 2pp.

Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.

Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.

Haywood et al., "Carbon dioxide sequestration as stable carbonate minerals—environmental barriers"; Environmental Geology (2001) 41:11-16; Springer-Verlag 2001.

Hill et al., "Preliminary Investigation of Carbon Sequestration Potential in Brine from Pennsylvania's Oriskany Sandstone Formation in Indiana County, PA"; The Energy Institute and the Department of Energy & Geo-Environmental Engineering; 5pp.

Holze, S. et al. 1994. Hydrogen Consuming Anodes for Energy Saving in Sodium Sulphate Electrolysis. *Chem. Eng. Technol.* 17: 382-389.

Huijgen, W.J.J., et al. 2003. Carbon dioxide sequestration by mineral carbonation. ECN-C-03-016; Energy Research Centre of the Netherlands: Petten; pp. 1-42.

Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.

Huntzinger, D.N. et al.,"Carbon Dioxide Sequestration in Cement Kiln Dust through Mineral Carbonation"; Environmental Science & Technology, vol. 43, No. 6 (2009) pp. 1986-1992.

International Search Report dated Sep. 17, 2008 of PCT/US2008/068564.

International Search Report dated Feb. 19, 2009 of PCT/US08/88242.

International Search Report dated Mar. 11, 2009 of PCT/US2008/088318.

International Search Report dated Mar. 11, 2009 of PCT/2008/088246.

International Search Report dated Aug. 5, 2009 of PCT/2009/048511.

International Search Report dated Sep. 8, 2009 of PCT/US2009/045722.

International Search Report dated Sep. 17, 2009 of PCT/US2009/050756.

International Search Report dated Sep. 22, 2009 of PCT/US2009/047711.

International Search Report dated Oct. 19, 2009 of PCT/US2009/050223.

International Search Report dated Oct. 30, 2009 of PCT/US09/056573.

Justnes, H. et al. "Pozzolanic, Amorphous Silica Produced from the Mineral Olivine." Proceedings of the Seventh CANMET/ACI International Conference on Fly Ash, Silica Fume, Slag and Natural Pozzolans in Concrete, 2001. SP-199-44. pp. 769-781.

Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.

Lackner, K. "Carbonate Chemistry for Sequestering Fossil Carbon"; Annual Review Energy Environ. 2002 27:193-232.

Lackner, K.S. et al. "Carbon Dioxide Disposal in Carbonate Minerals." Energy. 1995. 20(11): 1153-1170.

Levy, D. "Burnt biomass causes short-term global cooling, long-term warming." http://news-service.stanford.edu/news/2004/august4/biomass-84.html. 3 pages.

Mazrou, S., et al. 1997. Sodium hydroxide and hydrochloric acid generation from sodium chloride and rock salt by electro-electrodialysis. *Journal of Applied Electrochemistry* 27: 558-567.

Montes-Hernandez, G. et al.,"Mineral sequestration of CO2 by aqueous carbonation of coal combustion fly-ash." Journal of Hazardous Materials vol. 161 (2009). pp. 1347-1354.

Nayak, V.S. "Nonelectrolytic Production of Caustic Soda and Hydrochloric Acid from Sodium Chloride"; Ind. Eng. Chem. Res. 1996. 35: 3808-3811.

O'Connor et al., "Carbon Dioxide Sequestration by Direct Mineral Carbonation: Results From Recent Studies and Current Status";

Albany Research Center, Albany Oregon; Office of Fossil Energy, US Dept. of Energy; 1st Annual DOE Carbon Sequestration Conference, Washington DC, May (2001) 12pp.

O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.

Park, A., et al. 2004. CO2 mineral sequestration: physically activated dissolution of serpentine and pH swing process. *Chemical Engineering Science* 59 (22-23): 5241-5247.

Rahardianto et al., "High recovery membrane desalting of low-salinity brackish water: Integration of accelerated precipitation softening with membrane RO"; Science Direct; Journal of Membrane Science 289 (2007) 123-137.

Rakib, M. et al. 1999. Behaviour of Nafion® 350 membrane in sodium sulfate electrochemical splitting: continuous process modelling and pilot scale tests. Journal of Applied Electrochemistry. 29: 1439-1448.

Rau, G. 2004. Possible use of Fe/CO2 fuel cells for CO2 mitigation plus H2 and electricity production. *Energy Conversion and Management*. 45: 2143-2152.

Raz et al., "Formation of High-Magnesium Calcites via an Amorphous Precursor Phase: Possible Biological Implications"; Advanced Materials; Adv. Mater. (2000) vol. 12, No. 1; 5pp.

Rosenthal, E., "Cement Industry is at Center of Climate Change Debate" New York Times; www.nytimes.com/2007/10/26/business/worldbusiness/26cement.html"ref=todayspaper; 4pp.

Sadhwani et al., "Case Studies on environmental impact of seawater desalination" Science Direct; http://www.sciencedirect.com/science?_ob=ArticleURL&_udi=B6TFX-4HMX97J-3&_u... 3pp.

Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 (2003) pp. 653-663.

Shell Global Solutions, "ADIP-X and Sulfinol-X—new regenerable acid-gas removal processes"; Shell Global Solutions International; OG 130210370903-En(A); www.shellglobalsoultions.com 2 pp.

Tececo Pty Ltd, "Eco-Cement"; www.tececo.com/simple.eco-cement.php; Dec. 29, 2008; 6pp.

Turner, J.A. 1999. "A Realizable Renewable Energy Future." Science. 285 (5428): 687-689.

Uibu, M. et al. "CO2 mineral sequestration in oil-shale wastes from Estonian power production." Journal of Environmental Management vol. 90 (2009). pp. 1253-1260.

Uibu, M. et al.,"Mineral trapping of CO2 via oil shale ash aqueous carbonation: controlling mechanism of process rate and development of continuous-flow reactor system." Oil Shale, vol. 26, No. 1 (2009) pp. 40-58.

Uliasz-Bochenczyk, A. et al. "Utilization of Carbon Dioxide in Fly Ash and Water Mixtures." Chemical Engineering Research and Design. 2006. 84(A9): 843-846.

U.S. Appl. No. 12/375,632, filed Mar. 5, 2009. Kirk, Donald W. et al, Non-Final Office Action dated Sep. 8, 2009.

Wright, L.L., et al. 1993. "U.S. Carbon Offset Potential Using Biomass Energy Systems." Water, Air, and Soil Pollution. 70: 483-497.

International Search Report dated Dec. 14, 2009 of PCT/US09/061748.

* cited by examiner

US 7,993,511 B2

ELECTROCHEMICAL PRODUCTION OF AN ALKALINE SOLUTION USING $CO_2$

CROSS-REFERENCE

This application is a continuation-in-part of, and claims priority to, U.S. patent application Ser. No. 12/541,055 filed on Aug. 13, 2009, titled "Gas Diffusion Anode and $CO_2$ Cathode Electrolyte System" which is a continuation-in-part of U.S. patent application Ser. No. 12/503,557 filed on Jul. 15, 2009, titled: "CO2 Utilization In Electrochemical Systems", both of which are herein incorporated by reference in their entirety.

BACKGROUND OF THE INVENTION

In many chemical processes an alkaline solution is required to achieve a chemical reaction, e.g., to neutralize an acid, or buffer the pH of a solution, or precipitate an insoluble hydroxide and/or carbonate and/or bicarbonate from a solution. One method by which the alkaline solution is produced is by an electrochemical system as disclosed in the above-referenced US patent applications, herein incorporated by reference in their entirety. In producing an alkaline solution electrochemically, a large amount of energy, salt and water may be used; consequently, lowering the energy and material used is highly desired. An alkaline solution includes a solution comprising hydroxide ions, and/or carbonate ions, and/or bicarbonate ions.

SUMMARY OF THE INVENTION

In one embodiment, this invention pertains to an electrochemical system comprising a cathode electrolyte comprising added carbon dioxide, and contacting a cathode; and a first cation exchange membrane separating the cathode electrolyte from an anode electrolyte contacting an anode. In another embodiment, the invention pertains to an electrochemical method comprising adding carbon dioxide into a cathode electrolyte separated from an anode electrolyte by a first cation exchange membrane; and producing an alkaline solution in the cathode electrolyte without producing a gas at the anode in contact with the anode electrolyte. In another embodiment, the invention pertains to a method comprising producing an acid in an electrochemical system comprising added carbon dioxide in the cathode electrolyte; and contacting a mineral with the acid.

In some embodiments, the system comprises a second cation exchange membrane contacting the anode electrolyte; the carbon dioxide is contained in a waste gas; the waste gas comprises emissions from an electrical power generating plant, a cement plant, an ore processing facility or a fermentation system; atmospheric carbon dioxide is excluded from the cathode electrolyte; the cathode electrolyte is operatively connected to the industrial facility; the pH of the cathode electrolyte is 7 and above; the pH of the cathode electrolyte is between 7 and 14; the pH of the cathode electrolyte is between 7 and 9; the pH of the cathode electrolyte is between 8 and 11; the pH of the anode electrolyte is less than 7; the pH of the anode electrolyte is less than 4; the cathode electrolyte comprises hydroxide ions and/or bicarbonate ions and/or carbonate ions; the cathode electrolyte comprises sodium ions; the cathode electrolyte is operatively connected to a carbonate and/or bicarbonate precipitator; the carbonates and/or bicarbonates comprise calcium and/or magnesium; hydrogen is oxidized at the anode; the cathode is configured to produce hydrogen gas; a gas delivery system is configured to direct hydrogen gas from the cathode to the anode; the anode electrolyte comprises an acid and a salt solution; the salt solution comprises sodium ions and chloride ions; the system is configured to produce hydrogen ions at the anode with less than 1V across the anode and cathode, without producing a gas at the anode; the system is configured to migrate hydrogen ions into the anode electrolyte; the system is configured to produce hydroxide ions at the cathode; the system is configured to migrate hydroxide ions into the cathode electrolyte; the system is configured to migrate cations from the anode electrolyte into the cathode electrolyte; the cations comprise sodium ions; the anode electrolyte is operatively connected to a mineral dissolution system configured to dissolve minerals; the mineral solution comprises calcium ions and/or magnesium ions; the minerals comprises mafic minerals; the mineral dissolution system is operatively connected to a separator configured to separate sodium ions and chloride ions from the mineral solution; a concentrator is configured to concentrate sodium ions and chloride ions into a salt solution.

In some embodiments, the method comprises applying a voltage across the cathode in contact with the cathode electrolyte and the anode in contact with the anode electrolyte, wherein a gas is not produced at the anode; and wherein the voltage is less than 1V; and wherein the anode comprises a second cation exchange membrane contacting the anode electrolyte. In some embodiments, the method comprises producing hydroxide ions and/or bicarbonate ions and/or carbonate ions in the cathode electrolyte; wherein the carbon dioxide is contained in a waste gas, e.g., an industrial waste gas; wherein the waste gas is emitted from an industrial plant; wherein the industrial plant comprises an electrical power generating plant, a cement production plant or an ore processing facility and the like; wherein carbon dioxide in ambient air is excluded from the cathode electrolyte. In some embodiments, the method comprises maintaining a pH of 7 or greater in the cathode electrolyte; maintaining a pH of between 7 and 9 in the cathode electrolyte; maintaining a pH of between 8 and 11 in the cathode electrolyte; maintaining a pH of less than 7 in the anode electrolyte; maintaining a pH of less than 4 in the anode electrolyte; oxidizing hydrogen gas at the anode to produce hydrogen ions; migrating the hydrogen ions through the second cation exchange membrane into the anode electrolyte; producing hydroxide ions and hydrogen gas at the cathode and migrating hydroxide ions into the cathode electrolyte; directing hydrogen gas from the cathode to the anode; migrating cations ions through the first cation exchange membrane into the cathode electrolyte, wherein the cations comprise sodium ions; and producing an acid in the anode electrolyte.

In some embodiments, the method comprises producing an acid in the anode electrolyte, without generating a gas at the anode; oxidizing hydrogen gas at the anode; wherein the acid produced comprises hydrochloric acid; producing hydrogen gas at the cathode; producing an alkaline solution in the cathode electrolyte; migrating sodium ions into the cathode electrolyte; wherein the alkaline solution comprises sodium hydroxide, sodium bicarbonate and/or sodium carbonate; the voltage is less than 1V; the anode electrolyte is separated from the cathode electrolyte by first cation exchange membrane; the anode comprises a second cation exchange membrane in contact with the anode electrolyte; the anode electrolyte comprises a salt; the salt comprises sodium chloride. In some embodiments, the method comprises dissolving a mineral with the acid to produce a mineral solution; producing calcium ions and/or magnesium ions; the mineral comprises a mafic mineral; and the mineral solution is filtered to produce a filtrate comprising sodium ions and chloride ions solution.

In other embodiments, the method includes; concentrating the filtrate to produce a salt solution; utilizing the salt solution as the anode electrolyte; precipitating a carbonate and/or bicarbonate with the cathode electrolyte, wherein the carbonate and/or bicarbonate comprises calcium and/or magnesium carbonate and/or bicarbonate.

Accordingly, with the system and method, by selectively placing ion exchange membranes, e.g., cation exchange membranes, between the anode electrolyte and the cathode electrolyte; and by controlling the voltage across the anode and cathode, e.g., maintaining less than 2V; and by controlling the pH of the cathode electrolyte and/or the anode electrolyte; and by oxidizing hydrogen gas at the anode without producing a gas at the anode, an alkaline solution comprising hydroxide ions and/or carbonate ions and/or bicarbonate ions is produced in the cathode electrolyte; hydrogen gas is produced at the cathode; hydrogen ions are produced at the anode from hydrogen gas supplied to the anode, without producing a gas at the anode, and hydrogen ions are migrated into an electrolyte, e.g., the anode electrolyte, to produce an acid in the anode electrolyte. In various embodiments, utilizing hydrogen gas at the anode from hydrogen generated at the cathode, eliminates the need for an external supply of hydrogen; consequently, the overall utilization of energy by the system to produce the alkaline solution is reduced.

In some embodiments, the alkaline solution produced is utilized to sequester carbon dioxide, e.g., from industrial waste gases, into cementitious carbonate materials as disclosed, for example, in U.S. patent application Ser. No. 12/126,776 filed on May 23, 2008 and titled "Hydraulic Cements Comprising Carbonate Compound Compositions", herein incorporated by reference in its entirety.

Advantageously, with the present system and method, since a relatively low voltage is utilized across the anode and cathode to produce the alkaline solution, and since hydrogen generated at the cathode is utilized at the anode, a relatively low amount of energy is utilized to produce the alkaline solution. Also, by the system and method, since carbon dioxide from industrial waste gases is utilized to produce the alkaline solution, the system and method can be utilized to sequester large amounts of carbon dioxide and thus reduce carbon dioxide emissions into the atmosphere. Further, the acid produced can be utilized in various ways including dissolving materials, e.g., minerals and biomass.

BRIEF DESCRIPTION OF THE DRAWINGS

The following drawings illustrate by way of examples and not by limitation some embodiments of the present system and method.

DETAILED DESCRIPTION OF THE INVENTION

Figure 1:
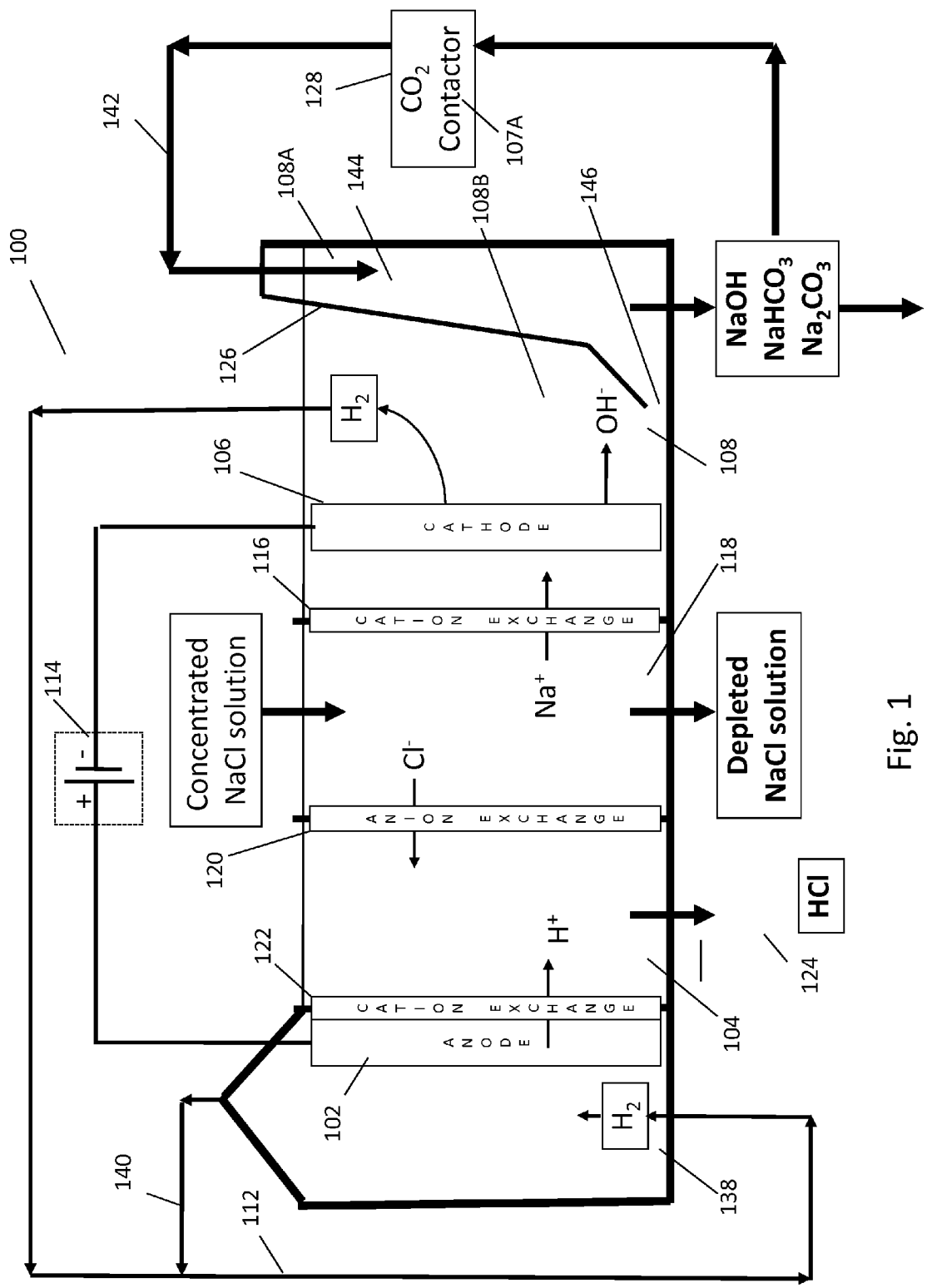
FIG. 1 is an illustration of an embodiment of the present system.

This invention provides systems and methods for an electrochemical production of an alkaline solution in a cathode electrolyte and an acid in an electrolyte, e.g., the anode electrolyte. In various embodiments, carbon dioxide is added to the cathode electrolyte and a gas is not produced at the anode; in various embodiments, an alkaline solution comprising, e.g., sodium hydroxide and/or sodium carbonate and/or sodium bicarbonate is produced in the cathode electrolyte. In various embodiments, a salt solution comprising, e.g., sodium chloride, is used as the anode electrolyte to produce the alkaline solution. Also, as described herein, an acid solution, e.g., hydrochloric acid, is produced in the anode electrolyte by hydrogen ions migrating from the anode into the anode electrolyte, and with cations, e.g., chloride ions, present in the anode electrolyte.

In some embodiments, the acid solution produced is utilized to dissolve a mineral, e.g., serpentine or olivine, to obtain a divalent cation solution, e.g., calcium and magnesium ion solution, which may in some embodiments be used with the alkaline solution to precipitate carbonates and/or bicarbonates derived from carbon dioxide in a waste gas stream, e.g., carbon dioxide in the exhaust gases of a fossil fuelled power generating plant or a cement producing plant. In some embodiments, a sodium chloride solution is used as the anode electrolyte.

Also, as disclosed herein, on applying a voltage across the anode and cathode, cations, e.g., sodium ions in the anode electrolyte, migrate from the anode electrolyte through the first cation exchange membrane into the cathode electrolyte to produce an alkaline solution comprising, sodium hydroxide and/or sodium carbonate and/or sodium bicarbonate in the cathode electrolyte; and anions in the anode electrolyte, e.g., chloride ions, and hydrogen ions migrated from the anode to produce an acid, e.g., hydrochloric acid in the anode electrolyte.

Further, as described herein, hydrogen gas and hydroxide ions are produced at the cathode, and in some embodiments, some or all of the hydrogen gas produced at the cathode is directed to the anode where it is oxidized to produce hydrogen ions.

However, as can be appreciated by one ordinarily skilled in the art, since the present system and method can be configured with an alternative, equivalent salt solution in the anode electrolyte, e.g., a potassium sulfate solution, to produce an equivalent alkaline solution, e.g., potassium hydroxide and/or potassium carbonate and/or potassium bicarbonate in the cathode electrolyte, and an equivalent acid, e.g., sulfuric acid in the anode electrolyte, by applying the voltage as disclosed herein across the anode and cathode, the invention is not limited to the exemplary embodiments described herein, but is adaptable for use with an equivalent salt solution, e.g., potassium sulfate, to produce an alkaline solution in the cathode electrolyte, e.g., potassium carbonate and/or potassium bicarbonate and an acid, e.g., sulfuric acid in the anode electrolyte.

Accordingly, to the extent that such equivalents are based on or suggested by the present system and method, these equivalents are within the scope of the appended claims.

Figure 7:
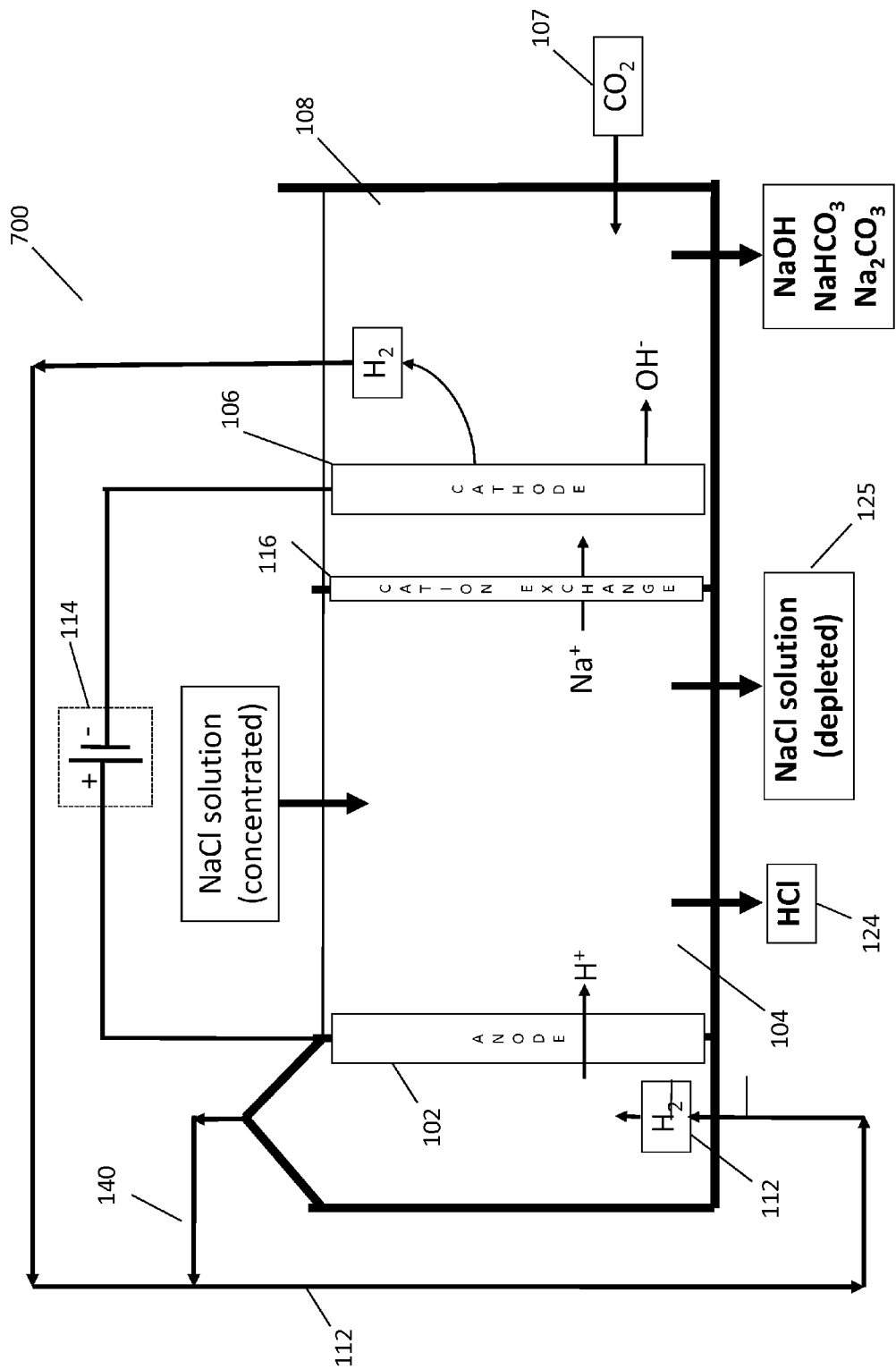
FIG. 7 is an illustration of an embodiment of the system.

With reference to FIG. 7, in one embodiment, the system 700 comprises a cathode 106 in contact with a cathode electrolyte 108 comprising added carbon dioxide 107, wherein the cathode electrolyte is separated from an anode electrolyte 104 by first cation exchange membrane 116. In an embodiment as is illustrated in FIG. 8, the system 800 comprises an anode 102 that is separated from the anode electrolyte by a second cation exchange membrane 122 that is in contact with the anode 102.

Figure 8:
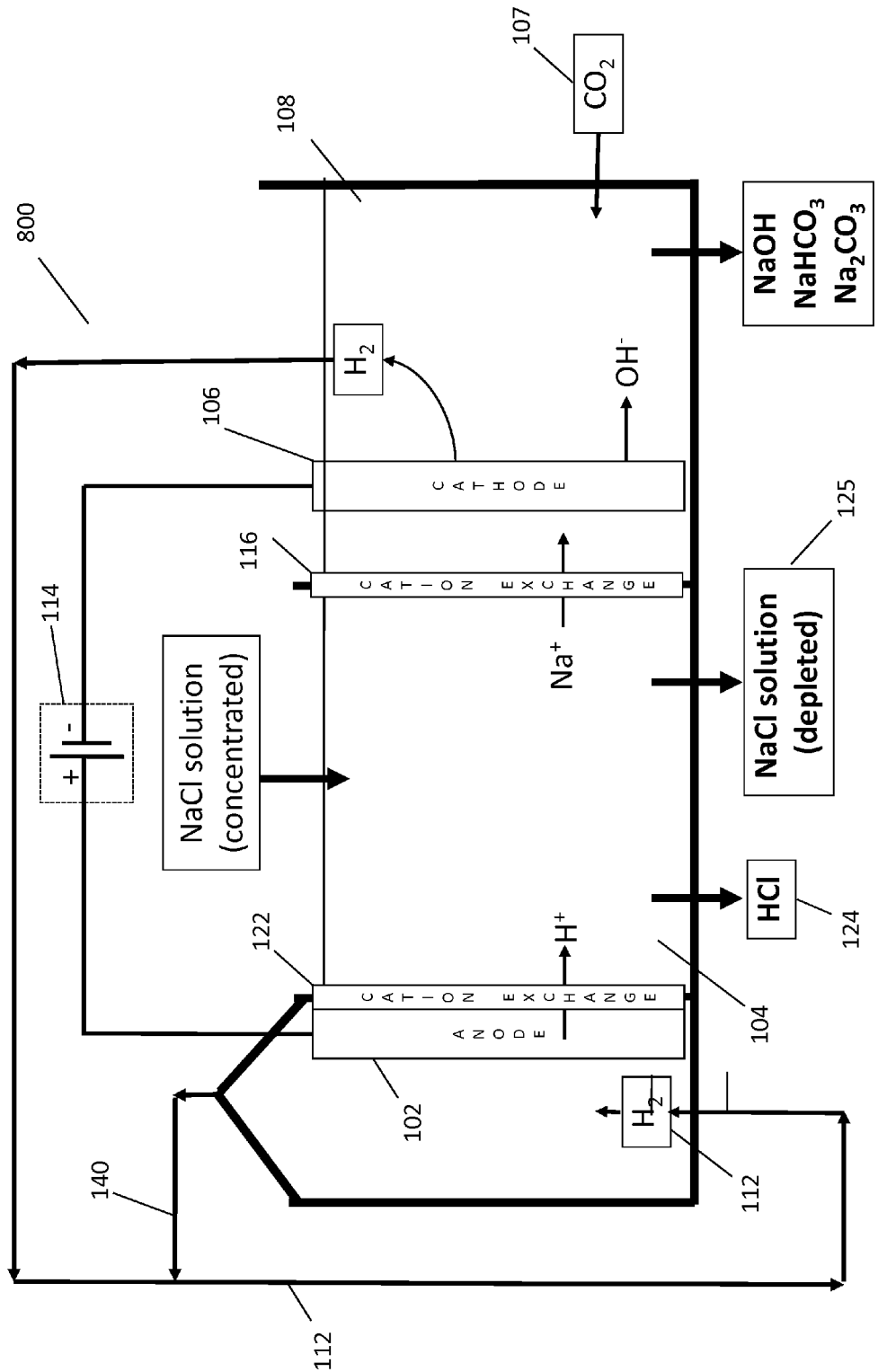
FIG. 8 is an illustration of an embodiment of the system.

In systems 700, 800 as illustrated in FIGS. 7 and 8, the first cation exchange membrane 116 is located between the cathode 106 and anode 102 such it separates the cathode electrolyte 108 from the anode electrolyte 104. Thus as is illustrated in FIGS. 7 and 8, on applying a relatively low voltage, e.g., less than 2V or less than 1V, across the anode 102 and cathode 106, hydroxide ions ($OH^-$) and hydrogen gas ($H_2$) are produced at the cathode 106, and hydrogen gas is oxidized at the anode 102 to produce hydrogen ions at the anode 102, without producing a gas at the anode. In certain embodiments, the hydrogen gas produced at the cathode is directed to the anode through a hydrogen gas delivery system 112, and is oxidized to hydrogen ions at the anode. In various embodiments, utilizing hydrogen gas at the anode from hydrogen generated at the cathode, eliminates the need for an external supply of hydrogen; consequently, the utilization of energy by the system to produce the alkaline solution is reduced.

In certain embodiments as illustrated in FIGS. 7 and 8, under the applied voltage 114 across the anode 102 and cathode 106, hydroxide ions are produced at the cathode 106 and migrate into the cathode electrolyte 108, and hydrogen gas is produced at the cathode. In certain embodiments, the hydrogen gas produced at the cathode 106 is collected and directed to the anode, e.g., by a hydrogen gas delivery system 122, where it is oxidized to produce hydrogen ions at the anode. Also, as illustrated in FIGS. 7 and 8, under the applied voltage 114 across the anode 102 and cathode 106, hydrogen ions produced at the anode 102 migrate from the anode 102 into the anode electrolyte 104 to produce an acid, e.g., hydrochloric acid.

In certain embodiments, the first cation exchange membrane 116 is selected to allow passage of cations therethrough while restricting passage of anions therethrough. Thus, as is illustrated in FIGS. 7 and 8, on applying the low voltage across the anode 102 and cathode 106, cations in the anode electrolyte 104, e.g., sodium ions in the anode electrolyte comprising sodium chloride, migrate into the cathode electrolyte through the first cation exchange membrane 116, while anions in the cathode electrolyte 108, e.g., hydroxide ions, and/or carbonate ions, and/or bicarbonate ions, are prevented from migrating from the cathode electrolyte through the first cation exchange membrane 116 and into the anode electrolyte 104.

Thus, as is illustrated in FIGS. 7 and 8, where the anode electrolyte 104 comprises an aqueous salt solution such as sodium chloride in water, a solution, e.g., and alkaline solution, is produced in the cathode electrolyte 108 comprising cations, e.g., sodium ions, that migrate from the anode electrolyte 104, and anions, e.g., hydroxide ions produced at the cathode 106, and/or carbonate ions and or bicarbonate ions produced by dissolving carbon dioxide 107 in the cathode electrolyte.

Concurrently, in the anode electrolyte 104, an acid, e.g., hydrochloric acid is produced from hydrogen ions migrating from the anode 102 and anions, e.g., chloride ions, present from the anode electrolyte.

With reference to FIG. 8, an anode comprising a second cation exchange membrane 122 is utilized to separate the anode 102 from the anode electrolyte 104 such that on a first surface, the cation exchange membrane 122 is in contact with the anode 102, and an opposed second surface it is in contact with the anode electrode electrolyte 104. Thus, as can be appreciated, in this embodiment, since the second cation exchange membrane is permeable to cations, e.g., hydrogen ions, the anode is in electrical contact with the anode electrolyte through the second cation exchange membrane. In some embodiments, the anode as illustrated in FIG. 8 may comprise a gas diffusion anode as described below.

Thus, in the embodiment of FIG. 8, as with the embodiment illustrated in FIG. 7, on applying the low voltage across the anode 102 and cathode 106, hydrogen ions produced at the anode 102 from oxidation of hydrogen gas at the anode migrate through the second cation exchange membrane 122 into the anode electrolyte 104. At the same time, cations in the anode electrolyte, e.g., sodium ions in the anode electrolyte comprising sodium chloride, migrate from the anode electrolyte 104 into the cathode electrolyte 108 through the first cation exchange membrane 116, while anions in the cathode electrolyte 108, e.g., hydroxide ions, and/or carbonate ions, and/or bicarbonate ions, are prevented from migrating from the cathode electrolyte 108 to the anode electrolyte 104 through the first cation exchange membrane 116.

Also, in the embodiment as illustrated in FIG. 8, hydrogen ions migrating from the anode 102 through the second cation exchange membrane 122 into the anode electrolyte 104 will produce an acid, e.g., hydrochloric acid with the cations, e.g., chloride ions, present in the anode electrolyte; and in the cathode electrolyte 108, an alkaline solution is produce from cations present in the cathode electrolyte and anions, e.g., sodium ions, that migrate from the anode to the cathode electrolyte through the first cation exchange membrane 116.

In some embodiments, cation exchange membranes 116 and 122 are conventional and are available from, for example, Asahi Kasei of Tokyo, Japan; or from Membrane International of Glen Rock, N.J., or DuPont, in the USA. However, it will be appreciated that in some embodiments, depending on the need to restrict or allow migration of a specific cation or an anion species between the electrolytes, a cation exchange membrane that is more restrictive and thus allows migration of one species of cations while restricting the migration of another species of cations may be used as, e.g., a cation exchange membrane that allows migration of sodium ions into the cathode electrolyte from the anode electrolyte while restricting migration of hydrogen ions from the anode electrolyte into the cathode electrolyte, may be used. Such restrictive cation exchange membranes are commercially available and can be selected by one ordinarily skilled in the art.

As is illustrated in FIG. 8, the anode 102 comprises a second cation exchange membrane 112 that separates the anode 102 from the anode electrolyte 104 and is attached to the anode. Thus, in some embodiments, the anode and second cation exchange membrane may comprise an integral gas diffusion anode that is commercially available, or can be fabricated as described for example in commonly assigned U.S. Provisional Patent Application No. 61/151,484, titled "Electro-catalyst Electrodes for Low-voltage electrochemical Hydroxide System", filed Feb. 10, 2009, herein fully incorporated by reference. However, as can be appreciated by one ordinarily skilled in the art, notwithstanding that a gas diffusion anode is illustrated and utilized in FIGS. 7 and 8 and described herein, in the some embodiments, any conventional anode that can be configured to oxidize hydrogen gas to produce hydrogen ions as described herein can be utilized.

With reference to FIGS. 7 and 8, in some embodiments, the cathode electrolyte 108 is operatively connected to a supply of carbon dioxide gas 107, contained, e.g., in an industrial plant, e.g., a power generating plant, a cement plant, or an ore smelting plant. If necessary, this source of carbon dioxide comprises a gas wherein the concentration of carbon dioxide is greater than the concentration of carbon dioxide in the ambient atmosphere. This source of carbon dioxide may also contain other gaseous and non-gaseous components of a combustion process, e.g., nitrogen gas, $SO_X$, $NO_X$, as is described in commonly assigned U.S. Provisional Patent application No. 61/223,657, titled "Gas, Liquids, Solids Contacting Methods and Apparatus", filed Jul. 7, 2009 herein fully incorporated by reference. However, as can be appreciated, this source of carbon dioxide can be cleaned and utilized as the carbon dioxide added to the cathode electrolyte 108.

Although carbon dioxide is present in ordinary ambient air, in view of its very low concentration, ambient carbon dioxide may not provide sufficient carbon dioxide to achieve the results obtained with the present system and method that utilize carbon dioxide taken from an industrial waste gas steam, e.g., from the stack gases of a fossil fuelled power generating plant or a cement production plant. Also, in some embodiments of the system and method, since the cathode electrolyte is contained in closed system wherein the pressure of the added carbon dioxide gas within the system is greater than the ambient atmospheric pressure, ambient air and hence ambient carbon dioxide is typically prevented from infiltrating into the cathode electrolyte.

In some embodiments, and with reference to FIGS. 5-8, carbon dioxide is added to the cathode electrolyte to dissolve and produce carbonic acid that dissociates to hydrogen ions and carbonate ions and/or bicarbonate ions, depending on the pH of the cathode electrolyte. Concurrently, as described above, hydroxide ions, produced from electrolyzing water in the cathode electrolyte, may react with the hydrogen ions to produce water in the cathode electrolyte. Thus, depending on the degree of alkalinity desired in the cathode electrolyte, the pH of the cathode electrolyte may be adjusted and in some embodiments is maintained between and 7 and 14 or greater; or between 7 and 9; or between 8 and 11 as is well understood in the art, and as illustrated in carbonate speciation diagram of FIG. 5. In some embodiments, the pH of the cathode electrolyte may be adjusted to any value between 7 and 14 or greater, including a pH 7.0, 7.5, 8.0, 8.5, 9.0, 9.5, 10.0, 10.5, 11.0, 11.5, 12.0, 12.5, 13.0, 13.5, 14.0 and greater.

Similarly, in some embodiments of the system, the pH of the anode electrolyte is adjusted and is maintained between less than 0 and up to 7 and/or between less than 0 and up to 4, by regulating the concentration of hydrogen ions that migrate into the anode electrolyte from oxidation of hydrogen gas at the anode, and/or the withdrawal and replenishment of anode electrolyte in the system. In this regard and as can be appreciated by one ordinarily skilled in the art and with reference to FIG. 6, since the voltage across the anode and cathode is dependent on several factors including the difference in pH between the anode electrolyte and the cathode electrolyte as can be determined by the Nerst equation, in some embodiments, the pH of the anode electrolyte is adjusted to a value between 0 and 7, including 0, 0.5, 1.0, 1.5, 2.0, 2.5, 3.0, 3.5, 4.0, 4.5, 5.0, 5.5, 6.0, 6.5 and 7, depending on the desired operating voltage across the anode and cathode. Thus, as can be appreciated, in equivalent systems, where it is desired to reduce the energy used and/or the voltage across the anode and cathode, e.g., as in the Chloralkali process, carbon dioxide can be added to the electrolyte as disclosed herein to achieve a desired pH difference between the anode electrolyte and cathode electrolyte. Thus, to the extent that such systems utilize carbon dioxide, these equivalent systems are within the scope of the present invention.

With reference to FIGS. 7 and 8, in some embodiments, the anode electrolyte 102 comprises a salt solution that includes sodium ions and chloride ions; the system 700, 800 is configured to produce the alkaline solution in the cathode electrolyte 108 while also producing hydrogen ions at the anode 106, with less than 1V across the anode 122 and cathode 106, without producing a gas at the anode; the system 700, 800 is configured to migrate hydrogen ions from the anode into the anode electrolyte; the anode electrolyte comprises an acid; the system 700, 800 is configured to produce bicarbonate ions and/or carbonate ions in the cathode electrolyte 108; migrate hydroxide ions from the cathode 106 into the cathode electrolyte; migrate cations, e.g., sodium ions, from the anode electrolyte 104 into the cathode electrolyte through the first cation exchange membrane 116; hydrogen gas is provided to the anode; and a hydrogen gas delivery system 112 is configured to direct hydrogen gas from the cathode to the anode.

Figure 9:
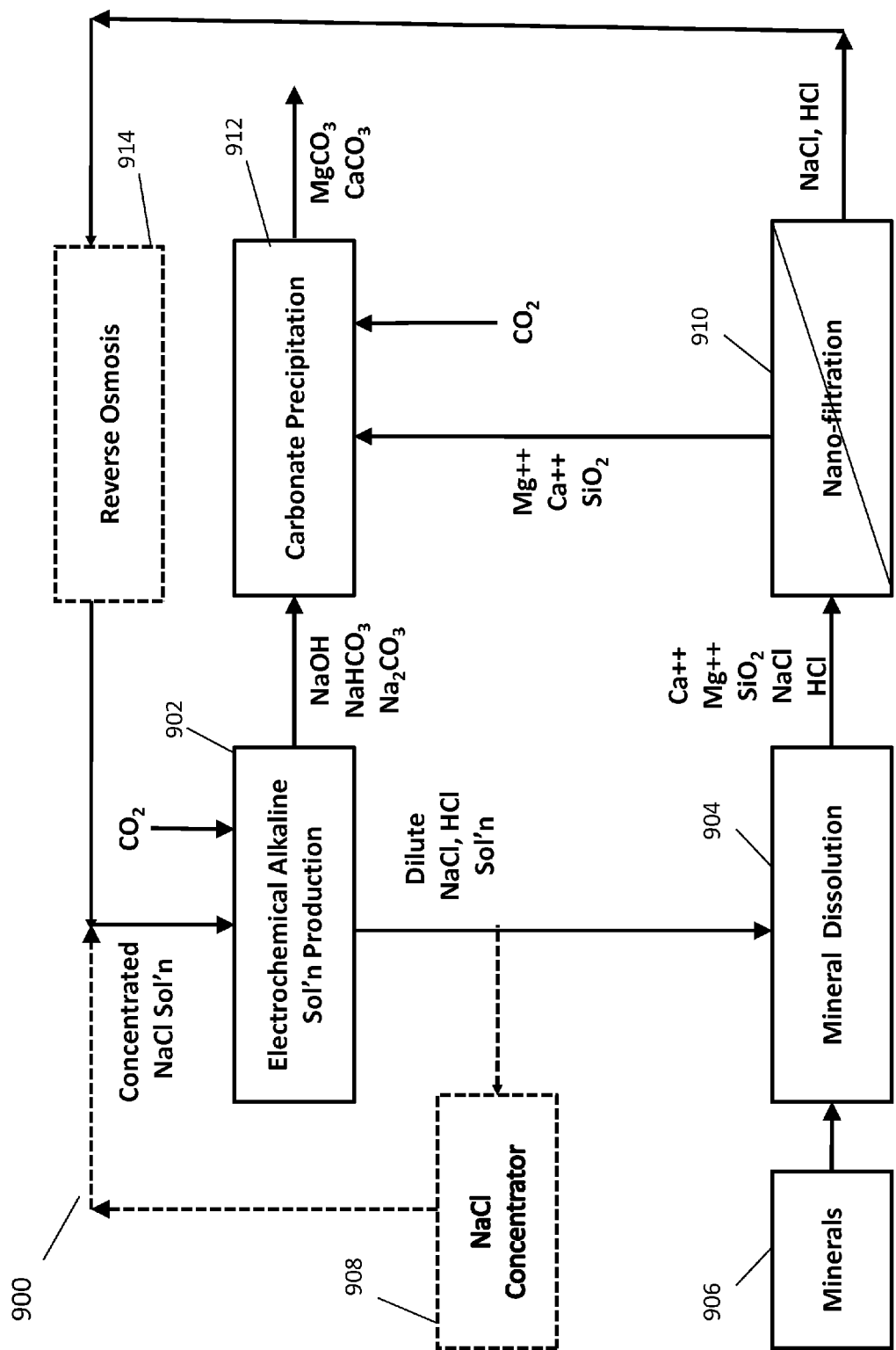
FIG. 9 is an illustration of an embodiment of the system.
Figure 10:
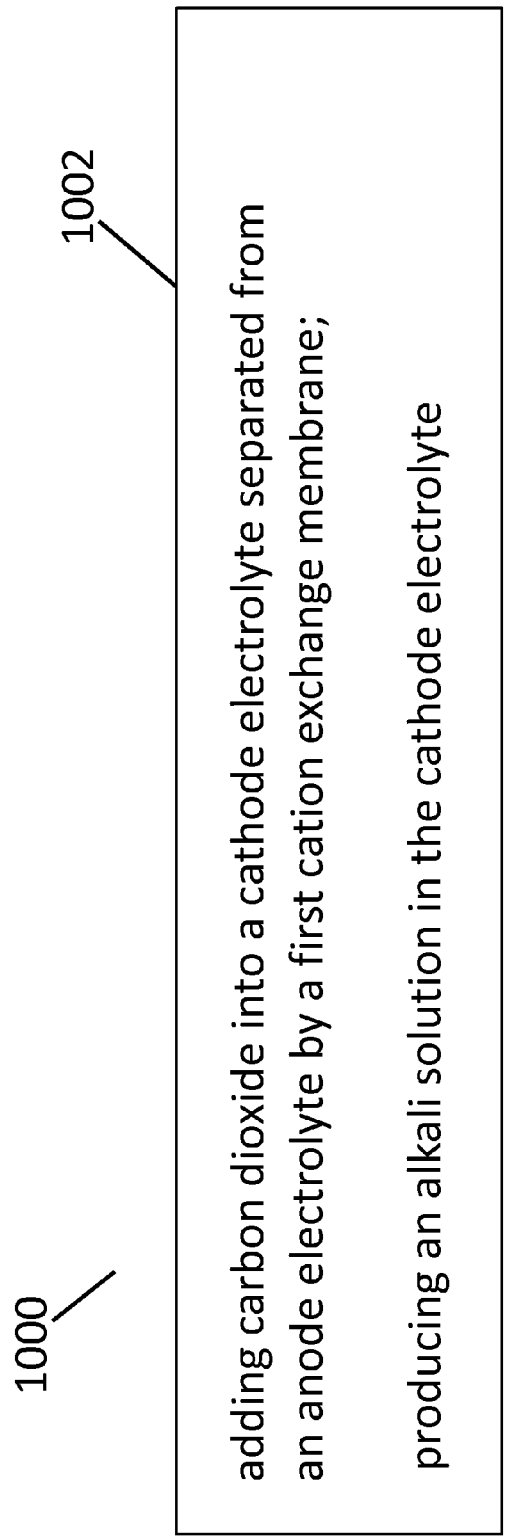
FIG. 10 is a flow chart of an embodiment of the method.
Figure 11:
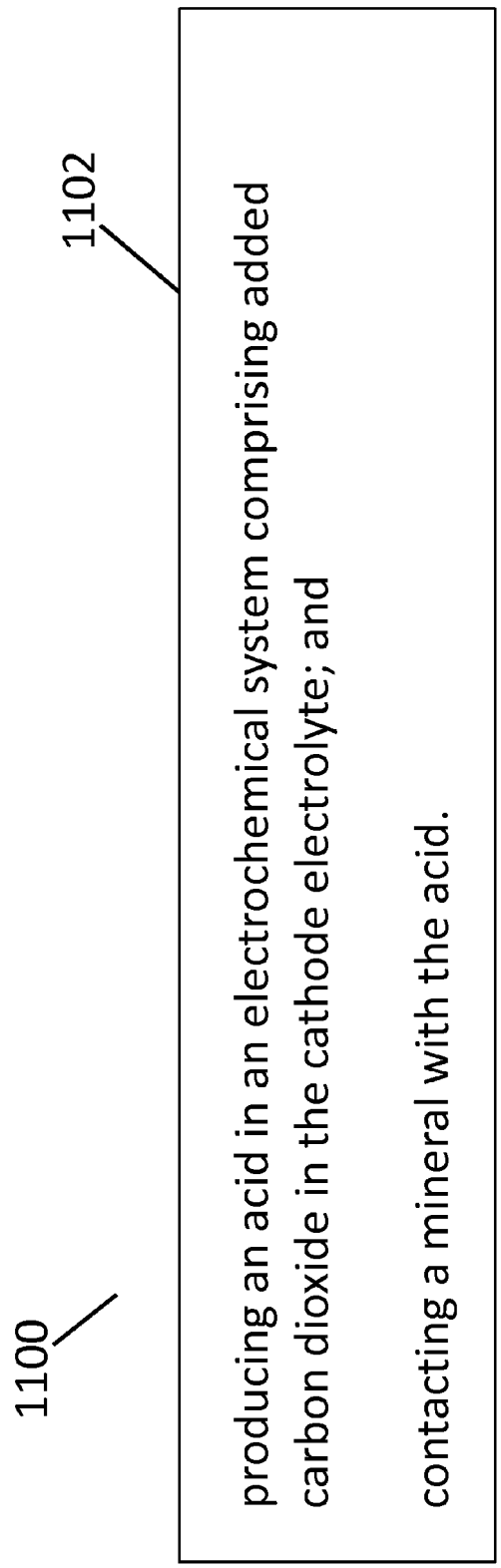
FIG. 11 is a flow chart of an embodiment of the method.

With reference to FIGS. 7-9, in some embodiments the cathode electrolyte 108 may be operatively connected to a system for further processing of the cathode electrolyte, e.g., a carbonate and/or bicarbonate precipitating system 912 comprising a precipitator configured to precipitate carbonates and/or bicarbonates from a solution, wherein in some embodiments the carbonates and/or bicarbonates comprise calcium and/or magnesium carbonate and/or bicarbonate. Also as illustrated in FIG. 9, in some embodiments, the anode electrolyte 104 comprising an acid, e.g., hydrochloric acid, and a depleted salt solution comprising low amount sodium ions, is operatively connected to a system for further processing of an acid, e.g., a mineral dissolution system 904 that is configured to dissolve minerals and produce a mineral solution comprising calcium ions and/or magnesium ions, e.g., mafic minerals such as olivine and serpentine. In some embodiments, not shown in FIG. 9, the acid may used for other purposes in addition to or instead of mineral dissolution. Such use includes use as a reactant in production of cellulosic biofules, use the production of polyvinyl chloride (PVC), and the like. System appropriate to such uses may be operatively connected to the electrochemistry unit, or the acid may be transported to the appropriate site for use.

In the some embodiments, the mineral dissolution system 904 is operatively connected to nano-filtration system 910 that is configured to separate sodium ions and chloride ions from the mineral solution comprising, e.g., calcium ions, magnesium ions, silica, hydrochloric acid and/or sodium hydroxide. In some embodiments, the nano-filtration system 910 is configured with a reverse osmosis system 914 that is capable of concentrating sodium ions and chloride ions into a salt solution that is used as the anode electrolyte 104.

With reference to FIGS. 1-10, the method 1000 in some embodiments comprises a step 1002 of adding carbon dioxide into a cathode electrolyte 108 in contact with a cathode 106 wherein the cathode electrolyte is separated from an anode electrolyte 104 by a first cation exchange membrane 116; and producing an alkaline solution in the cathode electrolyte by applying a voltage 114 of less that 1V across the cathode 106 and an anode 102 in contact with the anode electrolyte without producing a gas at the anode.

In some embodiments of the method 1000, the anode 102 is in contact with a second cation exchange membrane 122 that separates the anode from the anode electrolyte; the alkaline solution 108 comprises hydroxide ions and/or bicarbonate ions and/or carbonate ions; the carbon dioxide 107 is contained in wastes gases of an industrial plant, e.g., an electrical power generating plant, a cement production plant, a fermentation process or an ore processing facility.

In some embodiments, by the method 1000, ambient air is excluded the cathode electrolyte 108; a pH of between and 7 and 14 or greater us maintained in the cathode electrolyte; a pH of between 7 and 9 is maintained in the cathode electrolyte; a pH of between 8 and 11 is maintained in the cathode electrolyte; a pH of from less than 0 and up to 7 is maintained in the anode electrolyte; a pH of from less than 0 and up to 4 is maintained in the anode electrolyte; hydrogen gas is oxidized at the anode 102 to produce hydrogen ions and hydrogen ions are migrated from the anode through the second cation exchange membrane 122 into the anode electrolyte; hydroxide ions and hydrogen gas are produced at the cathode 106; hydroxide ions are migrated from the cathode 106 into the cathode electrolyte 108; hydrogen gas is directed from the cathode 106 to the anode 102; cations ions are migrated from the anode electrolyte 104 through the first cation exchange membrane 122 into the cathode electrolyte 108 wherein the cations comprise sodium ions.

In some embodiments, the method 1000 comprises producing sodium hydroxide and/or sodium carbonate ions and/or sodium bicarbonate ions in the cathode electrolyte 108; producing an acid and a depleted salt solution in the anode electrolyte 104 comprising sodium ions and chloride ions; utilizing the anode electrolyte to dissolve minerals 904 and produce a mineral solution comprising calcium ions and/or magnesium ions, wherein the minerals comprises mafic minerals; filtering the mineral solution 914 to produce a filtrate comprising sodium ions and chloride ions; concentrating the filtrate to produce the salt solution, wherein the concentrator comprises a reverse osmosis system 914; utilizing the salt solution as the anode electrolyte 104; precipitating a carbonate and/or bicarbonate with the cathode electrolyte 912; wherein the carbonate and/or bicarbonate comprises calcium and/or magnesium carbonate and/or bicarbonate. In some embodiments, the method includes disposing of the acid in an underground storage site where the acid can be stored in an un-reactive salt or rock formation and hence does not an environmental acidification.

With reference to FIGS. 1-9 and 11, the method 1100 in another embodiment comprises a step 1102 of producing an acid 124 in an electrochemical system, e.g., system 900, comprising added carbon dioxide 106A, 107 in the cathode electrolyte 108; and contacting a mineral 906 with the acid 124. In some embodiment the method further producing the acid in the anode electrolyte 104, without generating a gas at the anode 102, and oxidizing hydrogen gas 112 at the anode, wherein the acid comprises hydrochloric acid 124; and wherein the hydrogen gas 112 is produced at the cathode 106; producing an alkaline solution in the cathode electrolyte 108; migrating sodium ions into the cathode electrolyte; wherein the alkaline solution comprises sodium hydroxide, sodium bicarbonate and/or sodium carbonate; wherein the voltage is less than 2 V or less than 1V; wherein the anode electrolyte 104 is separated from the cathode electrolyte 108 by first cation exchange membrane 116; wherein the anode 102 comprises a second cation exchange membrane 122 in contact with the anode electrolyte 102; wherein the anode electrolyte comprises a salt, e.g., sodium chloride; dissolving a mineral 906 with the acid 124 to produce a mineral solution; producing calcium ions and/or magnesium ions; wherein the mineral comprises a mafic mineral, e.g. olivine or serpentine; filtering the mineral solution to produce a filtrate comprising sodium ions and chloride ions solution; concentrating the filtrate to produce a salt solution; utilizing the salt solution as the anode electrolyte 104; precipitating a carbonate and/or bicarbonate with the cathode electrolyte; wherein the carbonate and/or bicarbonate comprises calcium and/or magnesium carbonate and/or bicarbonate. In some embodiments, the method includes disposing of the acid in an underground storage site where the acid can be stored in an un-reactive salt or rock formation and hence does not an environmental acidification.

With reference to FIGS. 1-6, as disclosed in U.S. patent application Ser. No. 12/503,557 filed on Jul. 16, 2009, titled: "CO2 Utilization In Electrochemical Systems", herein incorporated by reference in its entirety, in some embodiments, carbon dioxide is absorbed into the cathode electrolyte utilizing a gas mixer/gas absorber. In one embodiment, the gas mixer/gas absorber comprises a series of spray nozzles that produces a flat sheet or curtain of liquid into which the gas is absorbed; in another embodiment, the gas mixer/gas absorber comprises a spray absorber that creates a mist and into which the gas is absorbed; in other embodiments, other commercially available gas/liquid absorber, e.g., an absorber available from Neumann Systems, Colorado, USA is used.

The carbon dioxide used in the system may be obtained from various industrial sources that releases carbon dioxide including carbon dioxide from combustion gases of fossil fuelled power plants, e.g., conventional coal, oil and gas power plants, or IGCC (Integrated Gasification Combined Cycle) power plants that generate power by burning sygas; cement manufacturing plants that convert limestone to lime; ore processing plants; fermentation plants; and the like. In some embodiments, the carbon dioxide may comprise other gases, e.g., nitrogen, oxides of nitrogen (nitrous oxide, nitric oxide), sulfur and sulfur gases (sulfur dioxide, hydrogen sulfide), and vaporized materials. In some embodiments, the system includes a gas treatment system that removes constituents in the carbon dioxide gas stream before the gas is utilized in the cathode electrolyte. In some embodiments, a portion of, or the entire amount of, cathode electrolyte comprising bicarbonate ions and/or carbonate ions/and or hydroxide ions is withdrawn from the system and is contacted with carbon dioxide gas in an exogenous carbon dioxide gas/liquid contactor to increase the absorbed carbon dioxide content in the solution. In some embodiments, the solution enriched with carbon dioxide is returned to the cathode compartment; in other embodiments, the solution enriched with carbon dioxide is reacted with a solution comprising divalent cations to produce divalent cation hydroxides, carbonates and/or bicarbonates. In some embodiments, the pH of the cathode electrolyte is adjusted upwards by hydroxide ions that migrate from the cathode, and/or downwards by dissolving carbon dioxide gas in the cathode electrolyte to produce carbonic acid and carbonic ions that react with and remove hydroxide ions. Thus it can be appreciated that the pH of the cathode electrolyte is determined, at least in part, by the balance of these two processes.

Referring to FIG. 1 herein, the system 100 in one embodiment comprises a gas diffusion anode 102 and a cathode 106 in contact with a cathode electrolyte 108, 108A, 108B comprising dissolved carbon dioxide 107A. The system in some embodiments includes a gas delivery system 112 configured to deliver hydrogen gas to the anode 102; in some embodiments, the hydrogen gas is obtained from the cathode 106. In the system, the anode 102 is configured to produce protons, and the cathode 106 is configured to produce hydroxide ions and hydrogen gas when a low voltage 114, e.g., less than 2V is applied across the anode and the cathode. In the system, a gas is not produced at the anode 102.

In the system as illustrated in FIG. 1, first cation exchange membrane 116 is positioned between the cathode electrolyte 108, 108 A, 108B and a salt solution 118; and an anion exchange membrane 120 is positioned between the salt solution 118 and the anode electrolyte 104 in a configuration where the anode electrolyte 104 is separated from the anode 102 by second cation exchange membrane 122. In the system, the second cation exchange membrane 122 is positioned between the anode 102 and the anode electrolyte 104 such that anions may migrate from the salt solution 118 to the anode electrolyte 104 through the anion exchange membrane 120; however, anions are prevented from contacting the anode 102 by the second cation exchange membrane 122 adjacent to the anode 102.

In some embodiments, the system is configurable to migrate anions, e.g., chloride ions, from the salt solution 118 to the anode electrolyte 104 through the anion exchange membrane 120; migrate cations, e.g., sodium ions from the salt solution 118 to the cathode electrolyte 108, 108A, 108B through the first cation exchange membrane 116; migrate protons from the anode 102 to the anode electrolyte 104; and migrate hydroxide ions from the cathode 106 to the cathode electrolyte 108, 108A, 108B. Thus, in some embodiments, the system can be configured to produce sodium hydroxide and/or sodium bicarbonate and/or sodium carbonate in the cathode electrolyte 108, 108A, 108B; and produce an acid e.g., hydrochloric acid 124 in the anode electrolyte.

In some embodiments as illustrated in FIG. 1, the system comprises a partition 126 that partitions the cathode electrolyte 108 into a first cathode electrolyte portion 108A and a second cathode electrolyte portion 108B, wherein the second cathode electrolyte portion 108B, comprising dissolved carbon dioxide, contacts the cathode 106; and wherein the first cathode electrolyte portion 108A comprising dissolved carbon dioxide and gaseous carbon dioxide is in contact with the second cathode electrolyte portion 108B under the partition 126. In the system, the partition is positioned in the cathode electrolyte such that a gas, e.g., carbon dioxide in the first cathode electrolyte portion 108A is isolated from cathode electrolyte in the second cathode electrolyte portion 108B. Thus, for example, where a gas, e.g., hydrogen, is generated at the cathode and it is desired to separate this cathode gas from a gas or vapor that may evolve from the cathode electrolyte, the partition may serve as a means to prevent mixing of the gases form the cathode and the gases and or vapor from the cathode electrolyte. While this system is illustrated in FIG. 1, it is applicable to any of the electrochemical system described herein, e.g., the systems illustrated in FIGS. 4, 7 and 8.

Thus, as can be appreciated, in some embodiments, on applying the present voltage across the anode and cathode, the system can be configured to produce hydroxide ions and hydrogen gas at the cathode 106; migrate hydroxide ions from the cathode into the cathode electrolyte 108, 108B, 108A; migrate cations from the salt solution 118 to the cathode electrolyte through the first cation exchange membrane 116; migrate chloride ions from the salt solution 118 to the anode electrolyte 104 through the anion exchange membrane 120; and migrate protons from the anode 102 to the anode electrolyte 104. Hence, depending on the salt solution 118 used, the system can be configured to produce an alkaline solution, e.g., sodium hydroxide in the cathode electrolyte.

In some embodiments, the system is operatively connected to a carbon dioxide gas/liquid contactor 128 configured to remove cathode electrolyte from the system and dissolve carbon dioxide in the cathode electrolyte in the gas/liquid contactor before the cathode electrolyte is returned to the system.

In other embodiments, the cathode electrolyte is operatively connected to a system (not shown) that is configured to precipitate divalent cation carbonates and/or divalent cation bicarbonates and/or divalent cation hydroxides from a solution comprising carbon dioxide gas and divalent cations.

Figure 2:
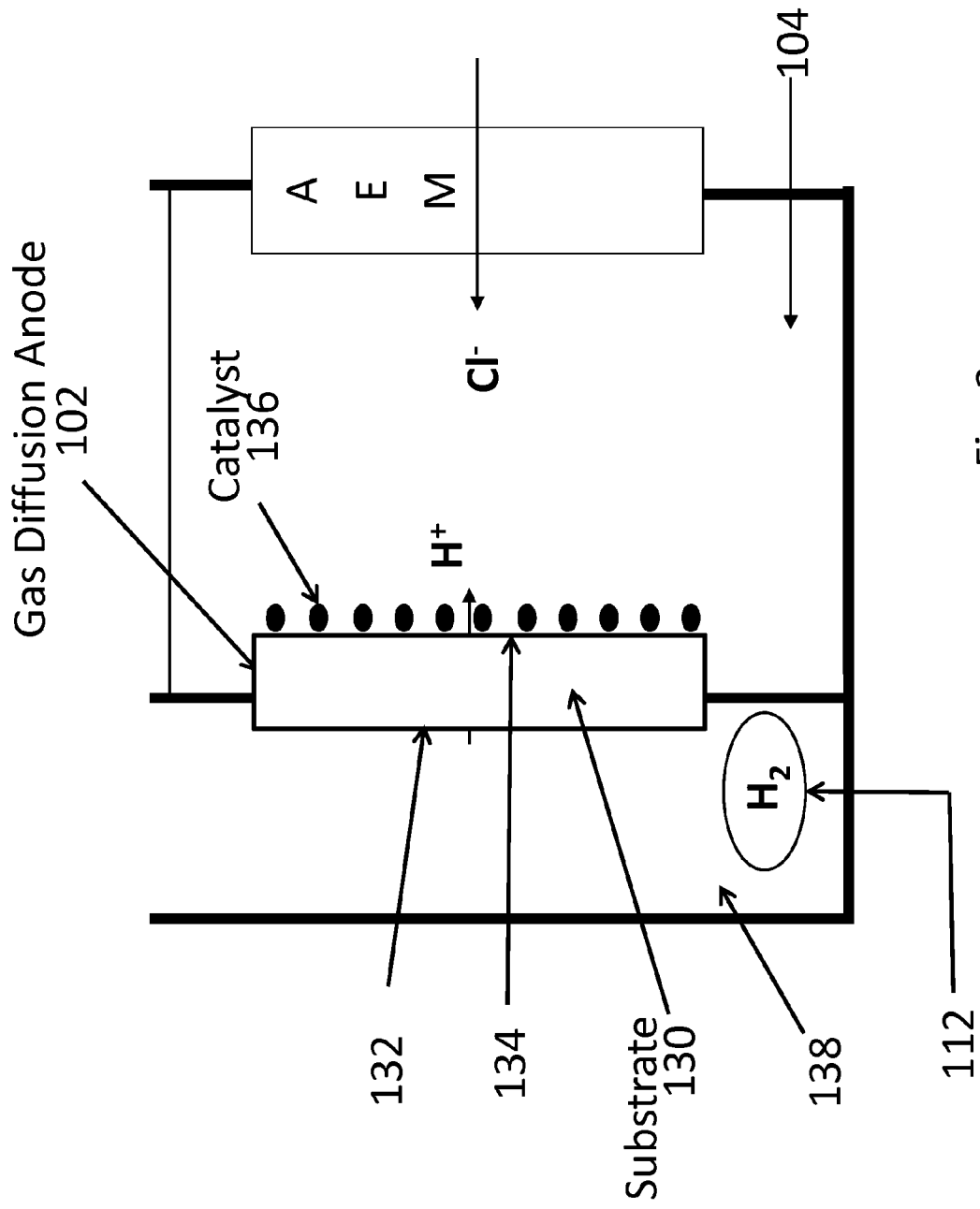
FIG. 2 is an illustration of an embodiment of the anode portion of the system.

FIG. 2 illustrates a schematic of a suitable gas diffusion anode that can be used in embodiments of the system described herein. In some embodiments, the gas diffusion anode comprises a conductive substrate 130 infused with a catalyst 136 that is capable of catalyzing the oxidation of hydrogen gas to protons when the present voltages are applied across the anode and cathode. In some embodiments, the anode comprises a first side 132 that interfaces with hydrogen gas provided to the anode, and an opposed second side 134 that interfaces with the anode electrolyte 104. In some embodiments, the portion of the substrate 132 that interfaces with the hydrogen gas is hydrophobic and is relatively dry; and the portion of the substrate 134 that interfaces with the anode electrolyte 104 is hydrophilic and may be wet, which facilitates migration of protons from the anode to the anode electrolyte. In various embodiments, the substrate is porous to facilitate the movement of gas from the first side 132 to the catalyst 136 that may be located on second side 134 of the anode; in some embodiments, the catalyst may also be located within the body of the substrate 130. The substrate 130 may be selected for its hydrophilic or hydrophobic characteristics as described herein, and also for its low ohmic resistance to facilitate electron conduction from the anode through a current collector connected to the voltage supply 114; the substrate may also be selected for it porosity to ion migration, e.g., proton migration, from the anode to the anode electrolyte 116.

In some embodiments, the catalyst may comprise platinum, ruthenium, iridium, rhodium, manganese, silver or alloys thereof. Suitable gas diffusion anodes are available commercially, e.g., from E-TEK (USA) and other suppliers. In some embodiments of the anode as is illustrated in FIG. 8, the anode comprises a ion exchange membrane, e.g., a cation exchange membrane 122 that contacts the second side 134 of the anode. In such embodiments, the ion exchange membrane can be used to allow or prevent migration of ions to or from the anode. Thus, for example, with reference to FIG. 8, when protons are generated at the anode, a cation exchange membrane may be used to facilitate the migration of the protons from the anode and/or block the migration of ions, e.g., cations to the substrate. In the some embodiments, the ion exchange membrane may be selected to preferentially allow passage of one type of cation, e.g., hydrogen ions, while preventing the passage of another type of ions, e.g., sodium ions.

As is illustrated in FIG. 1, the system includes a salt solution 118 located between the anode electrolyte 104 and the cathode electrolyte 108, 108A, 108B. In some embodiments, the cathode electrolyte is separated from the salt solution by a first cation exchange membrane 116 that is allows migration of cations, e.g., sodium ions, from the salt solution to the cathode electrolyte. The first cation exchange membrane 116 is also capable of blocking the migration of anions from the cathode electrolyte 108, 108A, 108B to the salt solution 118. In some embodiments, the anode electrolyte 104 is separated from the salt solution 118 by an anion exchange membrane 108 that will allow migration of anions, e.g., chloride ions, from the salt solution 118 to the anode electrolyte 104. The anion exchange membrane, however, will block the migration of cations, e.g., protons from the anode electrolyte 104 to the salt solution 118.

With reference to FIGS. 1 and 2, the system includes a hydrogen gas supply system 112 configured to provide hydrogen gas to the anode 102. The hydrogen may be obtained from the cathode 106 or may be obtained from external source, e.g., from a commercial hydrogen gas supplier, e.g., at start-up of the system when the hydrogen supply from the cathode is insufficient. In the system, the hydrogen gas is oxidized to protons and electrons; un-reacted hydrogen gas is recovered and circulated 140 at the anode.

Referring to FIG. 1, in operation, the cathode electrolyte 108, 108A, 108B is initially charged with a alkaline electrolyte, e.g., sodium hydroxide solution, and the anode electrolyte 104 is initially charged with an acidic electrolyte, e.g., dilute hydrochloric acid. The cathode electrolyte is also initially charged with carbon dioxide gas 107A, 128, and hydrogen gas is provided to the anode. In the system, on applying a voltage across the anode and cathode, protons produced at the anode will enter into the anode electrolyte and attempt to migrate from the anode electrolyte 104 to the cathode 106 via the salt solution 118 between the cathode and anode. However, since the anion exchange membrane will block the migration of protons to the salt solution, the protons will accumulate in the anode electrolyte 104.

Simultaneously at the cathode 106, the voltage across the anode and cathode will produce hydroxide ions and hydrogen gas at the cathode. In some embodiments, the hydrogen produced at the cathode is recovered and directed to the anode 102 where it is oxidized to protons. In the system, hydroxide ions produced at the cathode 106 will enter into the cathode electrolyte 108, 108A, 108B from where they will attempt to migrate to the anode 102 via the salt solution 118 between the cathode and anode. However, since the cathode electrolyte 108, 108A, 108B is separated from the salt solution electrolyte by the first cation exchange membrane 116 which will block the passage of anions, the first cation exchange membrane will block the migration of hydroxide ions from the cathode electrolyte to the salt solution; consequently, the hydroxide ions will accumulate in the cathode electrolyte 108, 108A, 108B.

In the system as illustrated in FIG. 1, with the voltage across the anode and cathode, since the salt solution is separated from the cathode electrolyte by the first cation exchange membrane 116, cations in the salt solution, e.g., sodium ions, will migrate through the first cation exchange membrane 116 to the cathode electrolyte 108, 108A, 108B, and anions, e.g., chloride ions, will migrate to the anode electrolyte through the anion exchange membrane 120. Consequently, in the system, as illustrated in FIG. 1, an acid, e.g., hydrochloric acid 124 will be produced in the anode electrolyte 104, and alkaline solution, e.g., sodium hydroxide will be produced in the cathode electrolyte. As can be appreciated, with the migration of cations and anions from the salt solution, the system in some embodiments can be configured to produce a partly de-ionized salt solution from the salt solution 118. In some embodiments, this partially de-ionized salt solution can be used as feed-water to a desalination facility (not shown) where it can be further processed to produce desalinated water as described in commonly assigned U.S. patent application Ser. No. 12/163,205 filed on Jun. 27, 2008, herein incorporated by reference in its entirety; alternatively, the solution can be used in industrial and agricultural applications where its salinity is acceptable.

With reference to FIG. 1, the system in some embodiments includes a second cation exchange membrane 124, attached to the anode substrate 105, such that it separates the anode 102 from the anode electrolyte. In this configuration, as the second cation exchange membrane 122 is permeable to cations, protons formed at the anode will migrate to the anode electrolyte as described herein; however, as the second cation exchange membrane 122 is impermeable to anions, anions, e.g., chloride ions, in the anode electrolyte will be blocked from migrating to the anode 102, thereby avoiding interaction between the anode and the anions that may interact with the anode, e.g., by corrosion.

With reference to FIG. 1, in some embodiments, the system includes a partition 128 configured into J-shape structure and positioned in the cathode electrolyte 108, 108A, 108B to define an upward-tapering channel 144 in the upper portion of the cathode electrolyte compartment. The partition also defines a downward-tapering channel 146 in lower portion of the cathode electrolyte. Thus, with the partition in the place, the cathode electrolyte 108 is partitioned into the first cathode electrolyte portion 108A and a second cathode electrolyte portion 108B. As is illustrated in FIG. 1, cathode electrolyte in the first cathode electrolyte portion 108A is in contact with cathode electrolyte in the second cathode electrolyte portion 108B; however, a gas in the first electrolyte portion 108A, e.g., carbon dioxide, is prevented from mixing with cathode electrolyte in the second cathode electrolyte 108B. Although this is illustrated in for the system of FIG. 1, such a configuration may be used in any system where it is desired to partition an electrolyte solution, e.g., a cathode electrolyte such that a gas that is introduced into one portion remains separate from another portion. For example, such a configuration may be used in any system as described herein as, e.g., in FIGS. 7 and 8.

With reference to FIG. 1, the system in some embodiments includes a cathode electrolyte circulating system 142 adapted for withdrawing and circulating cathode electrolyte in the system. In one embodiment, the cathode electrolyte circulating system comprises a carbon dioxide gas/liquid contactor 128 that is adapted for dissolving carbon dioxide in the circulating cathode electrolyte, and for circulating the electrolyte in the system. As can be appreciated, since the pH of the cathode electrolyte can be adjusted by withdrawing and/or circulating cathode electrolyte from the system, the pH of the cathode electrolyte compartment can be by regulated by regulating an amount of cathode electrolyte removed from the system through the carbon dioxide gas/liquid contactor 128.

Figure 4:
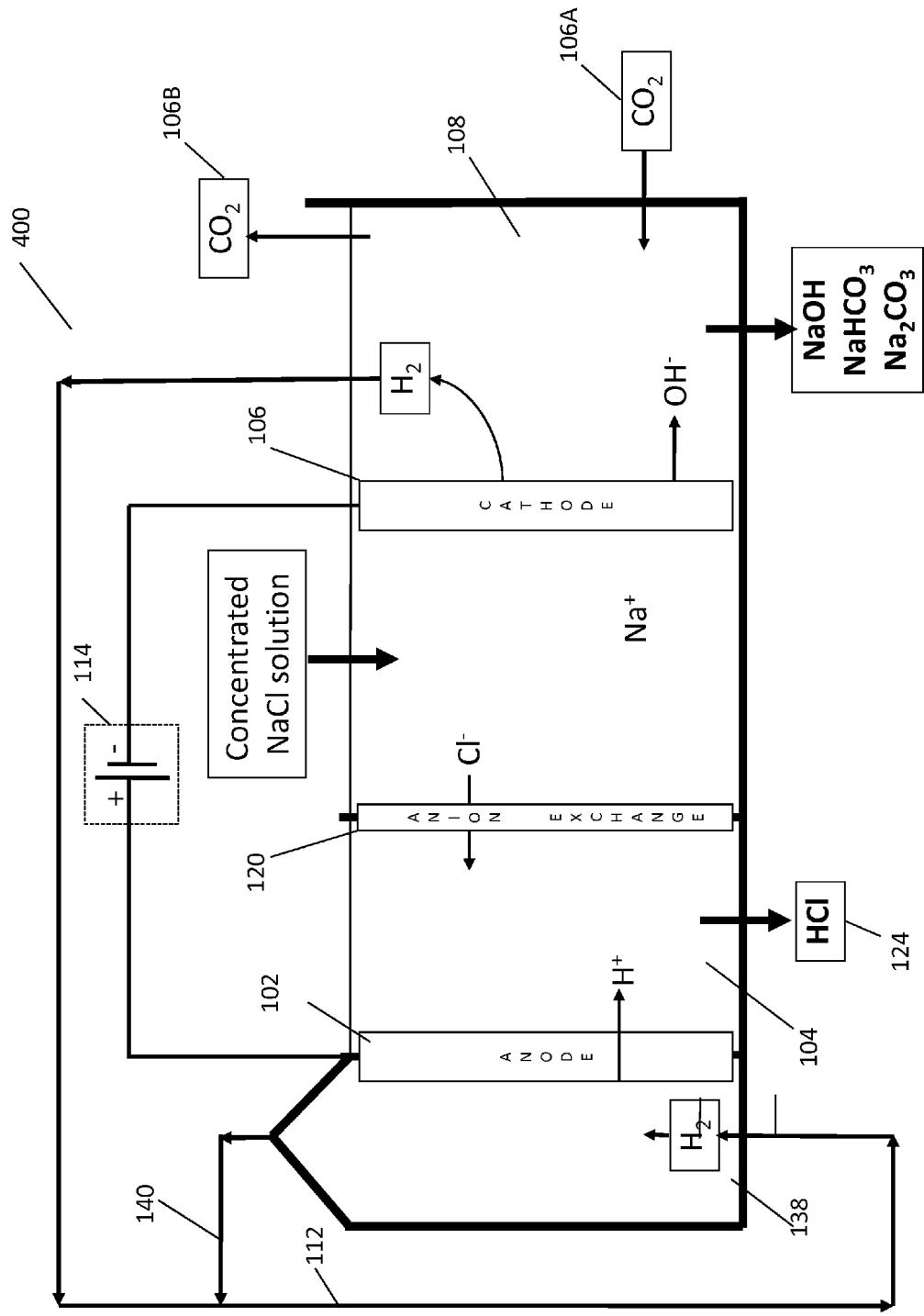
FIG. 4 is an illustration of an embodiment of the system.
Figure 5:
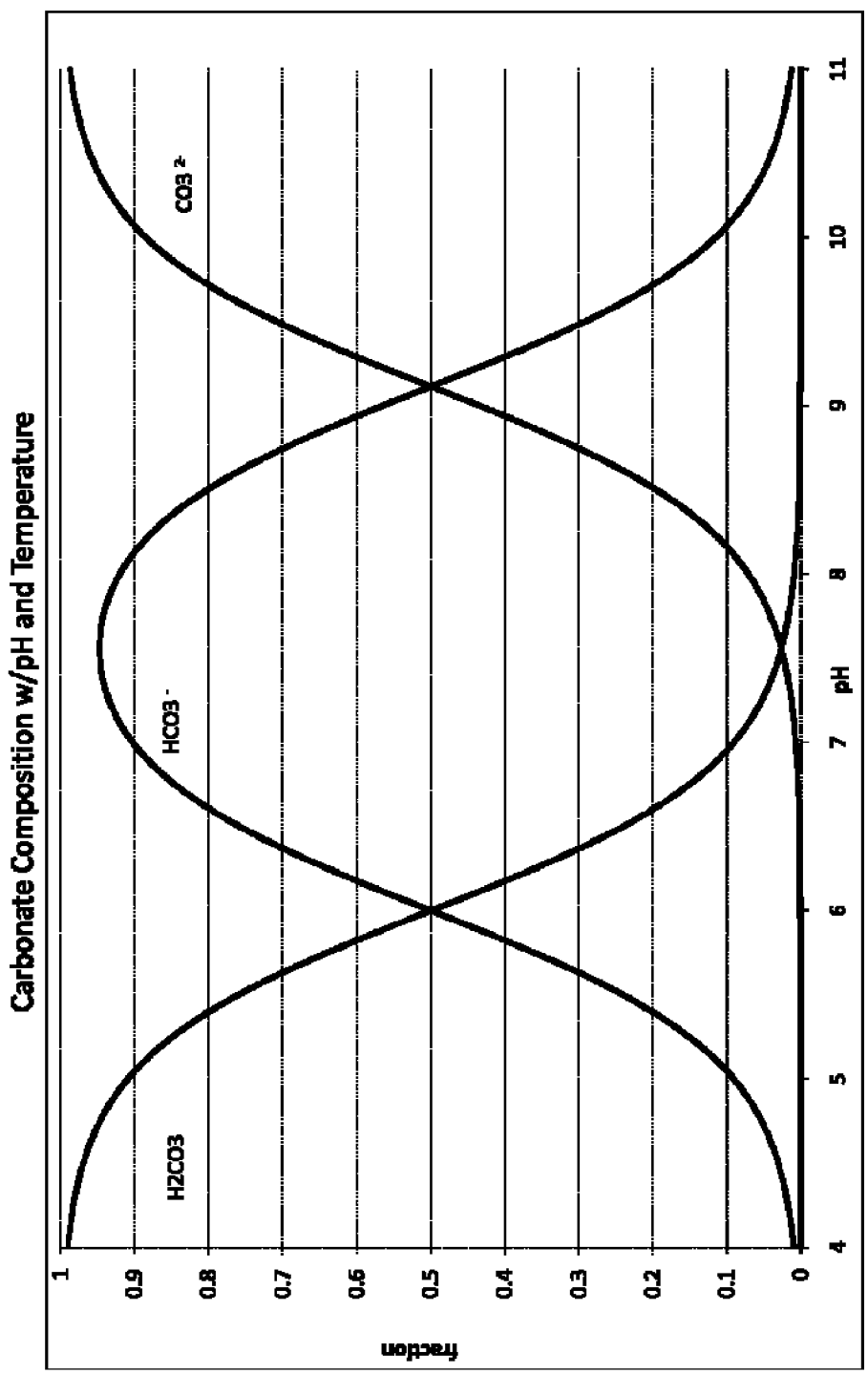
FIG. 5 is an illustration of the carbonate/bicarbonate ion speciation in $H_2O$ v. the pH of the solution at 25° C.

In an alternative as illustrated in FIG. 4, the system comprises a cathode 106 in contact with a cathode electrolyte 108 and an anode 102 in contact with an anode electrolyte 104. In this system, the cathode electrolyte comprises a salt solution that functions as the cathode electrolyte as well as a source of chloride and sodium ions for the alkaline and acid solution produced in the system. In this system, the cathode electrolyte is separated from the anode electrolyte by an anion exchange membrane 120 that allows migration of anions, e.g., chloride ions, from the salt solution to the anode electrolyte. As is illustrated in FIG. 4, the system includes a hydrogen gas delivery system 112 configured to provide hydrogen gas to the anode. The hydrogen may be obtained from the cathode and/or obtained from an external source, e.g., a commercial hydrogen gas supplier e.g., at start-up of operations when the hydrogen supply from the cathode is insufficient. In some embodiments, the hydrogen delivery system is configured to deliver gas to the anode where oxidation of the gas is catalyzed to protons and electrons. In some embodiments, unreacted hydrogen gas in the system is recovered and re-circulated to the anode.

Referring to FIG. 4, as with the system of FIG. 1, on applying a voltage across the anode and cathode, protons produced at the anode from oxidation of hydrogen will enter into the anode electrolyte from where they will attempt to migrate to the cathode electrolyte across the anion exchange membrane 120. However, since the anion exchange membrane 120 will block the passage of cations, the protons will accumulate in the anode electrolyte. At the same time, however, the anion exchange membrane 120 being pervious to anions will allow the migration of anions, e.g., chloride ions from the cathode electrolyte to the anode, thus in this embodiment, chloride ions will migrate to the anode electrolyte to produce hydrochloric acid in the anode electrolyte. In this system, the voltage across the anode and cathode is adjusted to a level such that hydroxide ions and hydrogen gas are produced at the cathode without producing a gas, e.g., chlorine or oxygen, at the anode. In this system, since cations will not migrate from the cathode electrolyte across the anion exchange membrane 116, sodium ions will accumulate in the cathode electrolyte 108 to produce an alkaline solution with hydroxide ions produced at the cathode. In embodiments where carbon dioxide gas is dissolved in the cathode electrolyte, sodium ions may also produce sodium bicarbonate and or sodium carbonate in the cathode electrolyte as described herein with reference to FIG. 1.

With reference to FIG. 1, depending on the pH of the cathode electrolyte, carbon dioxide gas introduced into the first cathode electrolyte portion 108A will dissolve in the cathode electrolyte and reversibly dissociate and equilibrate to produce carbonic acid, protons, carbonate and/or bicarbonate ions in the first cathode electrolyte compartment as follows:

$$CO_2 + H_2O \Longleftrightarrow H_2CO_3 \Longleftrightarrow H^+ + HCO_3^- \Longleftrightarrow H^+ + CO_3^{2-}$$

In the system, as cathode electrolyte in the first cathode electrolyte portion 108A may mix with second cathode electrolyte portion 108B, the carbonic acid, bicarbonate and carbonate ions formed in the first cathode electrolyte portion 108A by absorption of carbon dioxide in the cathode electrolyte may migrate and equilibrate with cathode electrolyte in the second cathode electrolyte portion 108B. Thus, in some embodiments, first cathode electrolyte portion 108A may comprise dissolved and un-dissolved carbon dioxide gas, and/or carbonic acid, and/or bicarbonate ions and/or carbonate ions; while second cathode electrolyte portion 108B may comprise dissolved carbon dioxide, and/or carbonic acid, and/or bicarbonate ions and/or carbonate ions.

With reference to FIG. 1, on applying a voltage across anode 102 and cathode 108, the system 100 may produce hydroxide ions and hydrogen gas at the cathode from water, as follows:

$$2H_2O + 2e^- = H_2 + 2OH^-$$

As cathode electrolyte in first cathode electrolyte portion 108A can intermix with cathode electrolyte in second cathode electrolyte portion 108B, hydroxide ions formed in the second cathode electrolyte portion may migrate and equilibrate with carbonate and bicarbonate ions in the first cathode electrolyte portion 108A. Thus, in some embodiments, the cathode electrolyte in the system may comprise hydroxide ions and dissolved and/or un-dissolved carbon dioxide gas, and/or carbonic acid, and/or bicarbonate ions and/or carbonate ions. In the system, as the solubility of carbon dioxide and the concentration of bicarbonate and carbonate ions in the cathode electrolyte are dependent on the pH of the electrolyte, the overall reaction in the cathode electrolyte 104 is either:

Scenario 1: $2H_2O + 2CO_2 + 2e^- = H_2 + 2HCO_3^-$; or

Scenario 2: $H_2O + CO_2 + 2e^- = H_2 + CO_3^{2-}$ or a combination of both, depending on the pH of the cathode electrolyte. This is illustrated in as a carbonate speciation diagram in FIG. 5.

For either scenario, the overall cell potential of the system can be determined through the Gibbs energy change of the reaction by the formula:

$$E_{cell} = -\Delta G/nF$$

Figure 6:
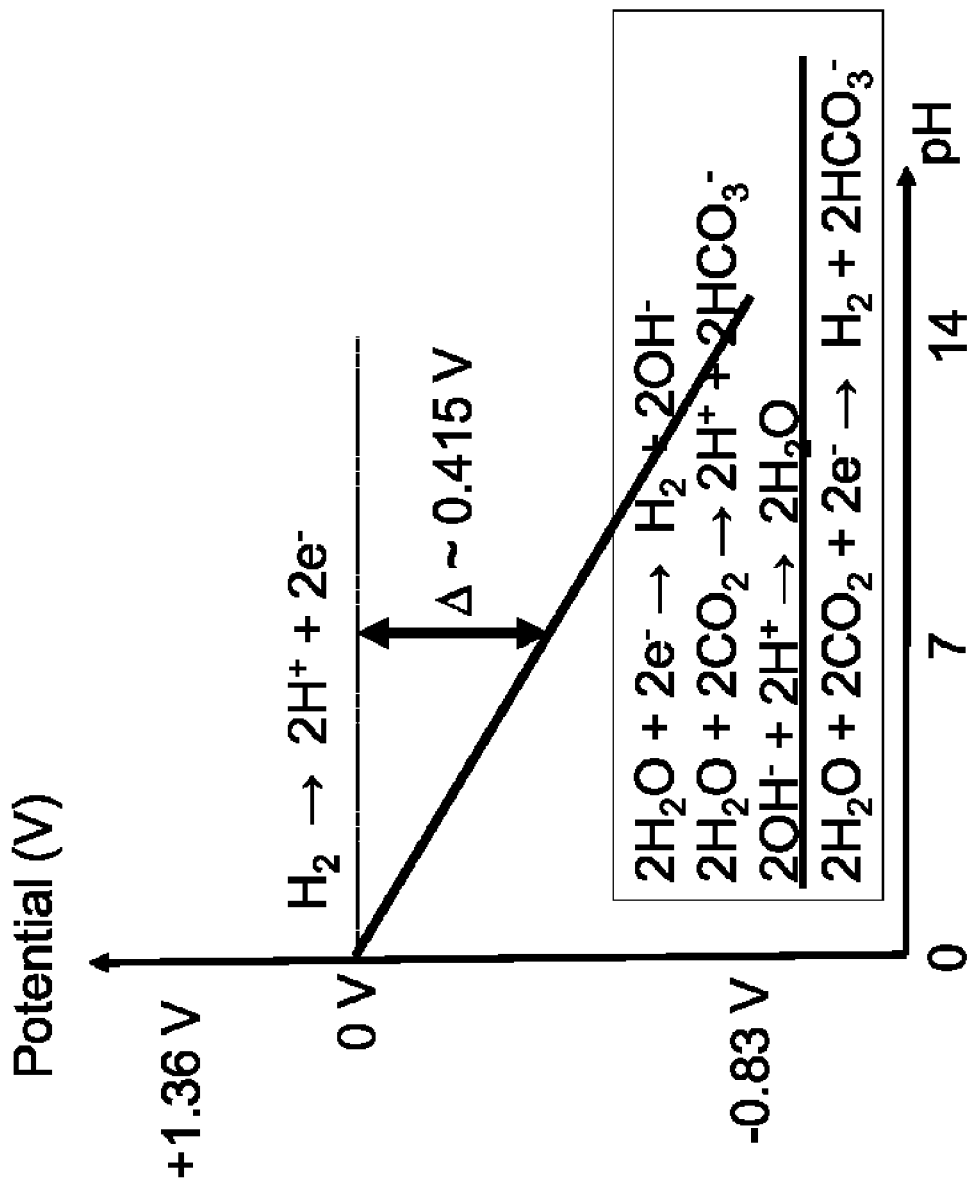
FIG. 6 is an illustration of a voltage difference across the anode and cathode v. pH of the cathode electrolyte in an embodiment of the system.

Or, at standard temperature and pressure conditions:

$$E°_{cell} = -\Delta G°/nF$$

where, $E_{cell}$ is the cell voltage, $\Delta G$ is the Gibbs energy of reaction, n is the number of electrons transferred, and F is the Faraday constant (96485 J/Vmol). The $E_{cell}$ of each of these reactions is pH dependent based on the Nernst equation as illustrated in FIG. 6.

Also, for either scenario, the overall cell potential can be determined through the combination of Nernst equations for each half cell reaction:

$$E = E° - RT \ln(Q)/nF$$

where, $E°$ is the standard reduction potential, R is the universal gas constant, (8.314 J/mol K) T is the absolute temperature, n is the number of electrons involved in the half cell reaction, F is Faraday's constant (96485 J/Vmol), and Q is the reaction quotient such that:

$$E_{total} = E_{cathode} + E_{anode}.$$

When hydrogen is oxidized to protons at the anode as follows:

$$H_2 = 2H^+ + 2e^-,$$

$E°$ is 0.00 V, n is 2, and Q is the square of the activity of $H^+$ so that:

$$E_{anode} = +0.059 \text{ pH}_a,$$

where $pH_a$ is the pH of the anode electrolyte.
When water is reduced to hydroxide ions and hydrogen gas at the cathode as follows:

$$2H_2O + 2e^- = H_2 + 2OH^-,$$

$E°$ is −0.83 V, n is 2, and Q is the square of the activity of $OH^-$ so that:

$$E_{cathode} = -0.059 \text{ pH}_c,$$

where $pH_c$ is the pH of the cathode electrolyte.

For either Scenario, the E for the cathode and anode reactions varies with the pH of the anode and cathode electrolytes. Thus, for Scenario 1 if the anode reaction, which is occurring in an acidic environment, is at a pH of 0, then the E of the reaction is 0V for the half cell reaction. For the cathode reaction, if the generation of bicarbonate ions occur at a pH of 7, then the theoretical E is 7×(−0.059V)=−0.413V for the half cell reaction where a negative E means energy is needed to be input into the half cell or full cell for the reaction to proceed. Thus, if the anode pH is 0 and the cathode pH is 7 then the overall cell potential would be −0.413V, where:

$$E_{total} = -0.059(pH_a - pH_c) = -0.059 \Delta pH.$$

For Scenario 2 in which carbonate ions are produced, if the anode pH is 0 and the cathode pH is 10, this would represent an E of 0.59 V.

Thus, in some embodiments, directing $CO_2$ gas into the cathode electrolyte may lower the pH of the cathode electrolyte by producing bicarbonate ions and/or carbonate ions in the cathode electrolyte, which consequently may lower the voltage across the anode and cathode in producing hydroxide, carbonate and/or bicarbonate in the cathode electrolyte.

Thus, as can be appreciated, if the cathode electrolyte is allowed to increase to a pH of 14 or greater, the difference between the anode half-cell potential (represented as the thin dashed horizontal line, Scenario 1, above) and the cathode half cell potential (represented as the thick solid sloping line in Scenario 1, above) will increase to 0.83V. With increased duration of cell operation without $CO_2$ addition or other intervention, e.g., diluting with water, the required cell potential will continue to increase. The cell potential may also increase due to ohmic resistance loses across the membranes in the electrolyte and the cell's overvoltage potential.

Herein, an overvoltage potential refers to the voltage difference between a thermodynamically determined half-cell reduction potential, and the experimentally observed potential at which the redox reaction occurs. The term is related to a cell voltage efficiency as the overvoltage potential requires more energy than is thermodynamically required to drive a reaction. In each case, the extra energy is lost as heat. Overvoltage potential is specific to each cell design and will vary between cells and operational conditions even for the same reaction.

In embodiments wherein it is desired to produce bicarbonate and/or carbonate ions in the cathode electrolyte, the system as illustrated in FIGS. 1-2, and as described above with reference to production of hydroxide ions in the cathode electrolyte, can be configured to produce bicarbonate ions and/or carbonate ions in the first cathode electrolyte by dissolving carbon dioxide in the first cathode electrolyte and applying a voltage of less than 3V, or less than 2.5 V, or less than 2V, or less than 1.5V such as less than 1.0V, or even less than 0.8 V or 0.6V across the cathode and anode.

In some embodiments, hydroxide ions, carbonate ions and/or bicarbonate ions produced in the cathode electrolyte, and hydrochloric acid produced in the anode electrolyte are removed from the system, while sodium chloride in the salt solution electrolyte is replenished to maintain continuous operation of the system. As can be appreciated, in some embodiments, the system can be configured to operate in various production modes including batch mode, semi-batch mode, continuous flow mode, with or without the option to withdraw portions of the hydroxide solution produced in the cathode electrolyte, or withdraw all or a portions of the acid produced in the anode electrolyte, or direct the hydrogen gas produced at the cathode to the anode where it may be oxidized.

In some embodiments, hydroxide ions, bicarbonate ions and/or carbonate ion solutions are produced in the cathode electrolyte when the voltage applied across the anode and cathode is less than 3V, 2.9V or less, 2.8V or less, 2.7V or less, 2.6V or less, 2.5V or less, 2.4V or less, 2.3V or less, 2.2V or less, 2.1V or less, 2.0V or less, 1.9V or less, 1.8V or less, 1.7V or less, 1.6V, or less 1.5V or less, 1.4V or less, 1.3V or less, 1.2V or less, 1.1V or less, 1.0V or less, 0.9V or less or less, 0.8V or less, 0.7V or less, 0.6V or less, 0.5V or less, 0.4V or less, 0.3V or less, 0.2V or less, or 0.1 V or less.

In another embodiment, the voltage across the anode and cathode can be adjusted such that gas will form at the anode, e.g., oxygen or chlorine, while hydroxide ions, carbonate ions and bicarbonate ions are produced in the cathode electrolyte and hydrogen gas is generated at the cathode. However, in this embodiment, hydrogen gas is not supplied to the anode. As can be appreciated by one ordinarily skilled in the art, in this embodiment, the voltage across the anode and cathode will be generally higher compared to the embodiment when a gas does not form at the anode.

With reference to FIGS. 1-2, in some embodiments, the invention provides for a system comprising one or more anion exchange membrane 120, and cation exchange membranes 116, 122 located between the gas diffusion anode 102 and the cathode 106. In some embodiments, the membranes should be selected such that they can function in an acidic and/or basic electrolytic solution as appropriate. Other desirable characteristics of the membranes include high ion selectivity, low ionic resistance, high burst strength, and high stability in an acidic electrolytic solution in a temperature range of 0° C. to 100° C. or higher, or a alkaline solution in similar temperature range may be used. In some embodiments, a membrane that is stable in the range of 0° C. to 80° C., or 0° C. to 90° C., but not stable above these ranges may be used. For other embodiments, it may be useful to utilize an ion-specific ion exchange membranes that allows migration of one type of cation but not another; or migration of one type of anion and not another, to achieve a desired product or products in an electrolyte. In some embodiments, the membrane should be stable and functional for a desirable length of time in the system, e.g., several days, weeks or months or years at temperatures in the range of 0° C. to 80° C., or 0° C. to 90° C. and higher and/or lower. In some embodiments, for example, the membranes should be stable and functional for at least 5 days, 10 days, 15 days, 20 days, 100 days, 1000 days or more in electrolyte temperatures at 80° C., 70° C., 60° C., 50° C., 40° C., 30° C., 20° C., 10° C., 5° C. and more or less.

As can be appreciated, the ohmic resistance of the membranes will affect the voltage drop across the anode and cathode, e.g., as the ohmic resistance of the membranes increase, the voltage drop across the anode and cathode will increase, and vice versa. Membranes currently available can be used and they include membranes with relatively low ohmic resistance and relatively high ionic mobility; similarly, membranes currently available with relatively high hydration characteristics that increase with temperatures, and thus decreasing the ohmic resistance can be used. Consequently, as can be appreciated, by selecting currently available membranes with lower ohmic resistance, the voltage drop across the anode and cathode at a specified temperature can be lowered.

Scattered through currently available membrane are ionic channels consisting of acid groups. These ionic channels may extend from the internal surface of the matrix to the external surface and the acid groups may readily bind water in a reversible reaction as water-of-hydration. This binding of water as water-of-hydration follows first order reaction kinetics, such that the rate of reaction is proportional to temperature. Consequently, currently available membranes can be selected to provide a relatively low ohmic and ionic resistance while providing for improved strength and resistance in the system for a range of operating temperatures. Suitable membranes are commercially available from Asahi Kasei of Tokyo, Japan; or from Membrane International of Glen Rock, N.J., and USA.

In some embodiments, the cathode electrolyte 108, 108A, 108B is operatively connected to a waste gas treatment system (not illustrated) where the alkaline solution produced in the cathode electrolyte is utilized, e.g., to sequester carbon dioxide contained in the waste gas by contacting the waste gas and the cathode electrolyte with a solution of divalent cations to precipitate hydroxides, carbonates and/or bicarbonates as described in commonly assigned U.S. patent application Ser. No. 12/344,019 filed on Dec. 24, 2008, herein incorporated by reference in its entirety. The precipitates, comprising, e.g., calcium and magnesium hydroxides, carbonates and bicarbonates in some embodiments may be utilized as building materials, e.g., as cements and aggregates, as described in commonly assigned U.S. patent application Ser. No. 12/126,776 filed on May 23, 2008, supra, herein incorporated by reference in its entirety. In some embodiments, some or all of the carbonates and/or bicarbonates are allowed to remain in an aqueous medium, e.g., a slurry or a suspension, and are disposed of in an aqueous medium, e.g., in the ocean depths or a subterranean site.

In some embodiments, the cathode and anode are also operatively connected to an off-peak electrical power-supply system 114 that supplies off-peak voltage to the electrodes.

Since the cost of off-peak power is lower than the cost of power supplied during peak power-supply times, the system can utilize off-peak power to produce an alkaline solution in the cathode electrolyte at a relatively lower cost.

In another embodiment, the system produces an acid, e.g., hydrochloric acid 124 in the anode electrolyte 104. In some embodiments, the anode compartment is operably connected to a system for dissolving minerals and/or waste materials comprising divalent cations to produce a solution of divalent cations, e.g., Ca++ and Mg++. In some embodiments, the divalent cation solution is utilized to precipitate hydroxides, carbonates and/or bicarbonates by contacting the divalent cation solution with the present alkaline solution and a source of carbon dioxide gas as described in U.S. patent application Ser. No. 12/344,019 filed on Dec. 24, 2008, supra, herein incorporated by reference in its entirety. In some embodiments, the precipitates are used as building materials e.g., cement and aggregates as described in commonly assigned U.S. patent application Ser. No. 12/126,776, supra, herein incorporated by reference in its entirety.

With reference to FIG. 1, on applying a voltage across the anode 102 and cathode 106, protons will form at the anode from oxidation of hydrogen gas supplied to the anode, while hydroxide ions and hydrogen gas will form at the cathode electrolyte from the reduction of water, as follows:

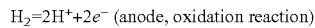

$H_2 = 2H^+ + 2e^-$ (anode, oxidation reaction)

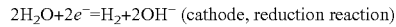

$2H_2O + 2e^- = H_2 + 2OH^-$ (cathode, reduction reaction)

Since protons are formed at the anode from hydrogen gas provided to the anode; and since a gas such as oxygen does not form at the anode; and since water in the cathode electrolyte forms hydroxide ions and hydrogen gas at the cathode, the system will produce hydroxide ions in the cathode electrolyte and protons in the anode electrolyte when a voltage is applied across the anode and cathode. Further, as can be appreciated, in the present system since a gas does not form at the anode, the system will produce hydroxide ions in the cathode electrolyte and hydrogen gas at the cathode and hydrogen ions at the anode when less than 2V is applied across the anode and cathode, in contrast to the higher voltage that is required when a gas is generated at the anode, e.g., chlorine or oxygen. For example, in some embodiments, hydroxide ions are produced when less than 2.0V, 1.5V, 1.4V, 1.3V, 1.2V, 1.1V, 1.0V, 0.9V, 0.8V, 0.7V, 0.6V, 0.5V, 0.4V, 0.3V, 0.2V, 0.1 V or less is applied across the anode and cathode.

As discussed above, in the system, on applying a voltage across the anode 102 and cathode 106, the positively charged protons formed at the anode will attempt to migrate to the cathode through the anode electrolyte 104, while the negatively charged hydroxide ions formed at the cathode will attempt to migrate to the anode through the cathode electrolyte 108, 108A, 108B. As is illustrated in FIG. 1 and with reference to hydroxide ions in the cathode electrolyte 108, 108A, 108B, since the first cation exchange membrane 116 will restrict the migration of anions from the cathode electrolyte 108, 108A, 108B, and since the anion exchange membrane 120 will prevent the migration of anions from the anode electrolyte 104 to the salt solution 118, the hydroxide ions generated in the cathode electrolyte will be prevented from migrating out of the cathode electrolyte through the cation exchange membrane. Consequently, on applying the voltage across the anode and cathode, the hydroxide ions produced at the cathode will be contained in the cathode electrolyte. Thus, depending on the flow rate of fluids into and out of the cathode electrolyte and the rate of carbon dioxide dissolution in the cathode electrolyte, the pH of the cathode electrolyte will adjust, e.g., the pH may increase, decrease or remain the same.

In some embodiments, depending on the ionic species desired in cathode electrolyte 108, 108A, 108B and/or the anode electrolyte 104 and/or the salt solution 118, alternative reactants can be utilized. Thus, for example, if a potassium salt such as potassium hydroxide or potassium carbonate is desired in the cathode electrolyte 1108, 108A, 108B, then a potassium salt such as potassium chloride can be utilized in the salt solution 118. Similarly, if sulfuric acid is desired in the anode electrolyte, then a sulfate such as sodium sulfate can be utilized in the salt solution 118. As described in some embodiments herein, carbon dioxide gas is absorbed in the cathode electrolyte; however, it will be appreciated that other gases, including volatile vapors, can be absorbed in the electrolyte, e.g., sulfur dioxide, or organic vapors to produce a desired result. As can be appreciated, the gas can be added to the electrolyte in various ways, e.g., by bubbling it directly into the electrolyte, or dissolving the gas in a separate compartment connected to the cathode compartment and then directed to the cathode electrolyte as described herein.

Figure 3:
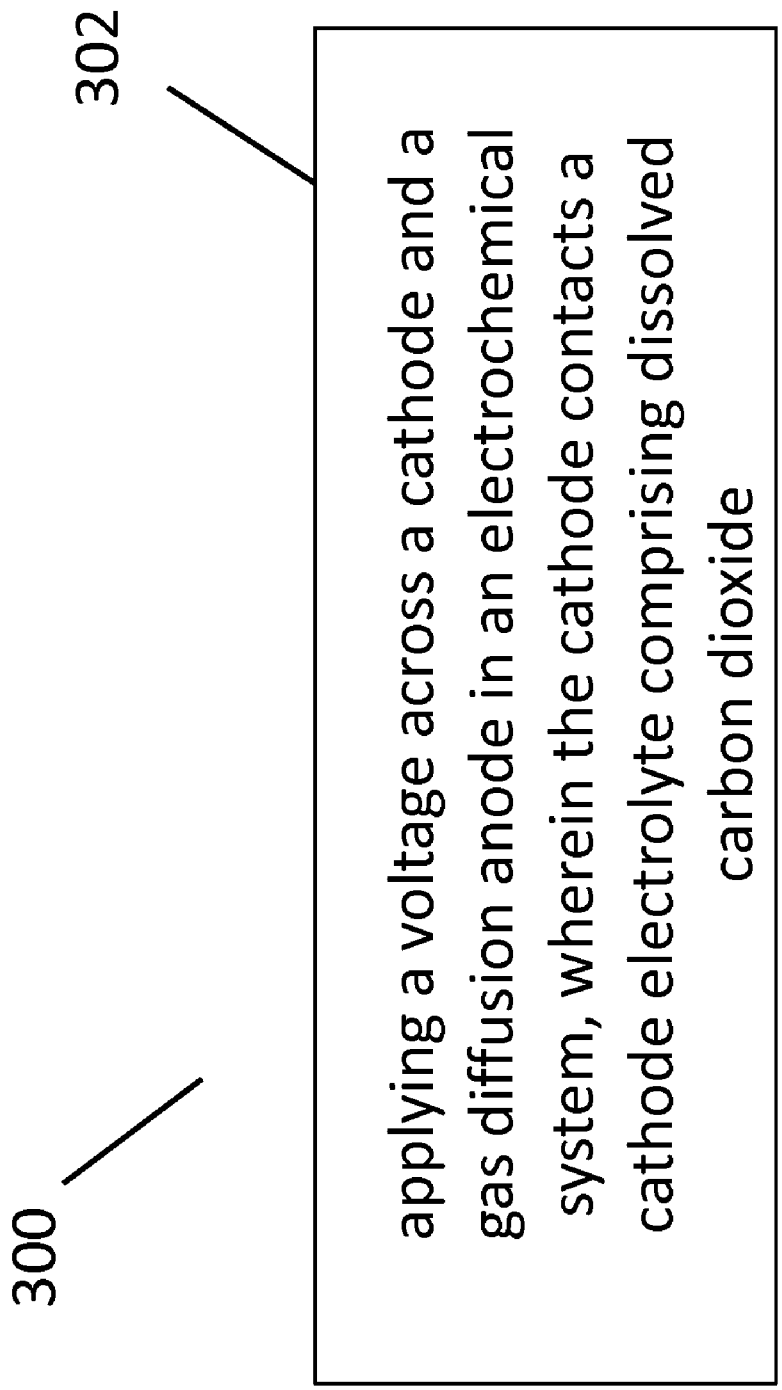
FIG. 3 is a flow chart of an embodiment of the method.

With reference to FIGS. 1 and 3, method 300 in some embodiments comprises a step 302 of applying a voltage across a cathode 106 and a gas diffusion anode 102 in an electrochemical system 100, wherein the cathode contacts a cathode electrolyte comprising dissolved carbon dioxide. In some embodiments, the method includes a step of providing hydrogen to the gas diffusion anode 102; a step of contacting the cathode 106 with a cathode electrolyte 108, 108A, 108B comprising dissolved carbon dioxide gas 107A; and a step of applying a voltage 114 across the anode and cathode; a step whereby protons are produced at the anode and hydroxide ions and hydrogen gas produced at the cathode; a step whereby a gas is not produced at the anode when the voltage is applied across the anode and cathode; a step wherein the voltage applied across the anode and cathode is less than 2V; a step comprising directing hydrogen gas from the cathode to the anode; a step comprising whereby protons are migrated from the anode to an anode electrolyte; a step comprising interposing an anion exchange membrane between the anode electrolyte and the salt solution; a step comprising interposing a first cation exchange membrane between the cathode electrolyte and the salt solution, wherein the salt solution is contained between the anion exchange membrane and the first cation exchange membrane; a step comprising whereby anions migrate from the salt solution to the anode electrolyte through the anion exchange membrane, and cations migrate from the salt solution to the cathode electrolyte through the first cation exchange membrane; a step comprising producing hydroxide ions and/or carbonate ions and/or bicarbonate ions in the cathode electrolyte; a step comprising producing an acid in the anode electrolyte; a step comprising producing sodium hydroxide and/or sodium carbonate and/or sodium bicarbonate in the cathode electrolyte; a step whereby hydrochloric acid is produced in the anode electrolyte; a step comprising contacting the cathode electrolyte with a divalent cation solution, wherein the divalent cations comprise calcium and magnesium ions; a step comprising producing partially desalinated water from the salt solution; a step comprising withdrawing a first portion of the cathode electrolyte and contacting the first portion of cathode electrolyte with carbon dioxide; and a step comprising contacting the first portion of cathode electrolyte with a divalent cation solution.

In some embodiments, hydroxide ions are formed at the cathode 106 and in the cathode electrolyte 108, 108A, 108B by applying a voltage of less than 2V across the anode and cathode without forming a gas at the anode, while providing hydrogen gas at the anode for oxidation at the anode. In some embodiments, method 300 does not form a gas at the anode when the voltage applied across the anode and cathode is less than 3V or less, 2.9V or less, 2.8V or less, 2.7V or less, 2.6V or less, 2.5V or less, 2.4V or less, 2.3V or less, 2.2V or less, 2.1V or less, 2.0V or less, 1.9V or less, 1.8V or less, 1.7V or less, 1.6V or less, 1.5V or less, 1.4V or less, 1.3V or less, 1.2V or less, 1.1V or less, 1.0V or less, 0.9V or less, 0.8V or less, 0.7V or less, 0.6V or less, 0.5V or less, 0.4V or less, 0.3V or less, 0.2V or less, or 0.1 V or less, while hydrogen gas is provided to the anode where it is oxidized to protons. As will be appreciated by one ordinarily skilled in the art, by not forming a gas at the anode and by providing hydrogen gas to the anode for oxidation at the anode, and by otherwise controlling the resistance in the system for example by decreasing the electrolyte path lengths and by selecting ionic membranes with low resistance and any other method know in the art, hydroxide ions can be produced in the cathode electrolyte with the present lower voltages.

In some embodiments, hydroxide ions, bicarbonate ions and carbonate ions are produced in the cathode electrolyte where the voltage applied across the anode and cathode is less than 3.0V, 2.9V, 2.8V, 2.7V, 2.6V, 2.5V, 2.4V, 2.3V, 2.2V, 2.1V, 2.0V, 1.9V, 1.8V, 1.7V, 1.6V, 1.5V, 1.4V, 1.3V, 1.2V, 1.1V, 1.0V, 0.9V, 0.8V, 0.7V, 0.6V, 0.5V, 0.4V, 0.3V, 0.2V, 0.1V or less without forming a gas at the anode. In some embodiments, the method is adapted to withdraw and replenish at least a portion of the cathode electrolyte and the acid in the anode electrolyte back into the system in either a batch, semi-batch or continuous mode of operation.

In an exemplarary embodiment, a system configured substantially as illustrated in FIGS. 1 and 2 was operated with a constant current density applied across the electrodes at steady state conditions while carbon dioxide gas was continuously dissolved into the cathode electrolyte, at various temperatures and voltages. In the system, a platinum catalyst, gas diffusion anode obtained from E-TEK Corporation, (USA) was used as the anode. A Raney nickel deposited onto a nickel gauze substrate was used as the cathode. In the system, the initial acid concentration in the anode electrolyte was 1 M; the initial sodium chloride salt solution was 5 M; and the initial concentration of the sodium hydroxide solution in the cathode compartment was 1 M. In the system, the pH of the cathode compartment was maintained at either 8 or 10 by regulating the amount of carbon dioxide dissolved in the cathode electrolyte.

TABLE 1

Experimental Current Density, Temperature and Voltage Characteristics of the System

| T (° C.) | Potential (V) | pH | Current density (mA/cm$^2$) |
|---|---|---|---|
| 25 | 0.8 | 10 | 8.6 |
|  |  | 8 | 11.2 |
|  | 1.2 | 10 | 28.3 |
|  |  | 8 | 29.2 |
|  | 1.6 | 10 | 50.2 |
|  |  | 8 | 50.6 |
| 75 | 0.8 | 10 | 13.3 |
|  |  | 8 | 17.8 |
|  | 1.2 | 10 | 45.3 |
|  |  | 8 | 49.8 |
|  | 1.6 | 10 | 80.8 |
|  |  | 8 | 84.7 |

As is illustrated in Table 1, a range of current densities was achieved across the electrode in the system. As will be appreciated by one ordinarily skilled in the art, the current density that can be achieved with other configurations of the system may vary, depending on several factors including the cumulative electrical resistance losses in the cell, environmental test conditions, the over-potential associated with the anodic and cathodic reactions, and other factors.

It will also be appreciated that the current densities achieved in the present configuration and as set forth in Table 1 are correlated with the production of hydroxide ions at the cathode, and thus are correlated with the production of sodium hydroxide and/or sodium carbonate and/or sodium bicarbonate in the cathode electrolyte, as follows. With reference to Table 1, at 75° C., 0.8 V and a pH of 10, each cm$^2$ of electrode passed 13.3 mA of current, where current is a measure of charge passed (Coulomb) per time (second). Based on Faraday's Laws, the amount of product, e.g., hydroxide ions, produced at an electrode is proportional to the total electrical charge passed through the electrode as follows:

$$n=(I*t)/(F*z)$$

where n is moles of product, I is a current, t is time, F is Faraday's constant, and z is the electrons transferred per product ionic species (or reagent ionic species). Thus, based on the present example, $1.38 \times 10^{-4}$ moles of hydroxide ions are produced per second per cm$^2$ of electrode, which is correlated with the production of sodium hydroxide in the cathode electrolyte. In the system the production rate of NaOH dictates the production rate of NaHCO$_3$ and Na$_2$CO$_3$ through Le Chatelier's principle following the net chemical equilibria equations of

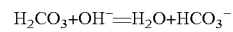

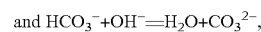

where an increase in concentration of one species in equilibria will change the concentration of all species so that the equilibrium product maintains the equilibrium constant. Thus, in the system, the equilibrium concentrations of H$_2$CO$_3$, HCO$_3^-$, and CO$_3^{2-}$ vs. pH in the electrolyte will follow the carbonate speciation diagram as discussed above.

In the system as illustrated in FIG. 1 and as discussed with reference to the carbonate speciation graph, supra, the solubility of carbon dioxide in the cathode electrolyte is dependent on the pH of the electrolyte. Also in the system, the voltage across the cathode and anode is dependent on several factors including the pH difference between the anode electrolyte and cathode electrolyte. Thus, in some embodiments the system can be configured to operate at a specified pH and voltage to absorb carbon dioxide and produce carbonic acid, carbonate ions and/or bicarbonate ions in the cathode electrolyte. In embodiments where carbon dioxide gas is dissolved in the cathode electrolyte, as protons are removed from the cathode electrolyte more carbon dioxide may be dissolved to form carbonic acid, bicarbonate ions and/or carbonate ions. Depending on the pH of the cathode electrolyte the balance is shifted toward bicarbonate ions or toward carbonate ions, as is well understood in the art and as is illustrated in the carbonate speciation diagram, above. In these embodiments the pH of the cathode electrolyte solution may decrease, remain the same, or increase, depending on the rate of removal of protons compared to rate of introduction of carbon dioxide. It will be appreciated that no carbonic acid, hydroxide ions, carbonate ions or bicarbonate ions are formed in these embodiments, or that carbonic acid, hydroxide ions, carbonate ions, bicarbonate ions may not form during one period but form during another period.

In another embodiment, the present system and method are integrated with a carbonate and/or bicarbonate precipitation system (not illustrated) wherein a solution of divalent cations, when added to the present cathode electrolyte, causes formation of precipitates of divalent carbonate and/or bicarbonate compounds, e.g., calcium carbonate or magnesium carbonate and/or their bicarbonates. In some embodiments, the precipitated divalent carbonate and/or bicarbonate compounds may be utilized as building materials, e.g., cements and aggregates as described for example in commonly assigned U.S. patent application Ser. No. 12/126,776 filed on May 23, 2008, herein incorporated by reference in its entirety.

In an alternative embodiment, the present system and method are integrated with a mineral and/or material dissolution and recovery system (not illustrated) wherein the acidic anode electrolyte solution 104 or the basic cathode electrolyte 108 is utilized to dissolve calcium and/or magnesium-rich minerals e.g., serpentine or olivine, or waste materials, e.g., fly ash, red mud and the like, to form divalent cation solutions that may be utilized, e.g., to precipitate carbonates and/or bicarbonates as described herein. In some embodiments, the precipitated divalent carbonate and/or bicarbonate compounds may be utilized as building materials, e.g., cements and aggregates as described for example in commonly assigned U.S. patent application Ser. No. 12/126,776 filed on May 23, 2008, herein incorporated by reference in its entirety.

In an alternative embodiment, the present system and method are integrated with an industrial waste gas treatment system (not illustrated) for sequestering carbon dioxide and other constituents of industrial waste gases, e.g., sulfur gases, nitrogen oxide gases, metal and particulates, wherein by contacting the flue gas with a solution comprising divalent cations and the present cathode electrolyte comprising hydroxide, bicarbonate and/or carbonate ions, divalent cation carbonates and/or bicarbonates are precipitated as described in commonly assigned U.S. patent application Ser. No. 12/344,019 filed on Dec. 24, 2008, herein incorporated by reference in its entirety. The precipitates, comprising, e.g., calcium and/or magnesium carbonates and bicarbonates in some embodiments may be utilized as building materials, e.g., as cements and aggregates, as described in commonly assigned U.S. patent application Ser. No. 12/126,776 filed on May 23, 2008, herein incorporated by reference in its entirety.

In another embodiment, the present system and method are integrated with an aqueous desalination system (not illustrated) wherein the partially desalinated water of the third electrolyte of the present system is used as feed-water for the desalination system, as described in commonly assigned U.S. patent application Ser. No. 12/163,205 filed on Jun. 27, 2008, herein incorporated by reference in its entirety.

In an alternative embodiment, the present system and method are integrated with a carbonate and/or bicarbonate solution disposal system (not illustrated) wherein, rather than producing precipitates by contacting a solution of divalent cations with the first electrolyte solution to form precipitates, the system produces a solution, slurry or suspension comprising carbonates and/or bicarbonates. In some embodiments, the solution, slurry or suspension is disposed of in a location where it is held stable for an extended periods of time, e.g., the solution/slurry/suspension is disposed in an ocean at a depth where the temperature and pressure are sufficient to keep the slurry stable indefinitely, as described in U.S. patent application Ser. No. 12/344,019 filed on Dec. 24, 2008, herein incorporated by reference in its entirety; or in a subterranean site.

The invention claimed is:

1. An electrochemical system comprising:
   a cathode electrolyte comprising added carbon dioxide and in contact with a cathode in a cathode compartment;
   a first cation exchange membrane separating the cathode electrolyte from an anode electrolyte wherein the anode electrolyte is in contact with an anode in an anode compartment and comprises a salt and an acid;
   a mineral dissolution system operatively connected to the anode compartment and wherein the mineral dissolution system is configured to dissolve a mineral with the acid in the anode electrolyte and produce a mineral solution comprising divalent cations, un-reacted acid and the salt; and
   a nano-filtration system operatively connected to the mineral dissolution system and wherein the nano-filtration system is configured to receive the mineral solution and produce a first mineral solution comprising the salt and un-reacted acid, and a second mineral solution comprising divalent cations.

2. The electrochemical system of claim 1, comprising a second cation exchange membrane in contact with the anode and wherein the second cation exchange membrane is configured to separate the anode from the anode electrolyte.

3. The electrochemical system of claim 1, wherein the carbon dioxide added to the cathode electrolyte is contained in a waste gas from an industrial operation comprising an electrical power generating plant, a cement plant, an ore processing facility or a fermentation system.

4. The electrochemical system of claim 3, wherein the cathode electrolyte is configured to prevent atmospheric carbon dioxide from entering into the cathode electrolyte.

5. The electrochemical system of claim 4, wherein the cathode electrolyte is operatively connected to the industrial facility to receive the waste gas comprising carbon dioxide.

6. The electrochemical system of claim 5, wherein water is reduced to hydroxide ions and hydrogen gas at the cathode with an applied voltage across the anode and cathode, and wherein hydroxide ions at the cathode are migrated into the cathode electrolyte to produce the cathode electrolyte comprising hydroxide ions and/or bicarbonate ions and/or carbonate ions.

7. The electrochemical system of claim 6, wherein hydrogen gas is oxidized to hydrogen ions at the anode and wherein the hydrogen ions are migrated into the anode electrolyte to form the acid in the anode electrolyte.

8. The electrochemical system of claim 7, wherein the anode is configured to oxidize hydrogen gas to hydrogen ions and the cathode is configured to produce hydroxide ions and hydrogen gas with less than 1V applied across the anode and cathode, without producing a gas at the anode.

9. An method comprising:
   adding carbon dioxide into a cathode electrolyte in contact with a cathode in a cathode compartment of an electrochemical system wherein the cathode electrolyte is separated from an anode electrolyte by a first cation exchange membrane and wherein the anode electrolyte is in contact with an anode in an anode compartment;
   producing an alkaline solution in the cathode electrolyte without producing a gas at the anode in contact with the anode electrolyte by applying a voltage across the anode and cathode to reduce water to hydroxide ions and hydrogen gas at the cathode, migrate the hydroxide ions into the cathode electrolyte, and migrate cations from a salt in the anode electrolyte into the cathode electrolyte through the first cation exchange membrane;

producing an acid in the anode electrolyte by reducing hydrogen at the anode to hydrogen ions and migrating the hydrogen ions into the anode electrolyte;

dissolving a mineral using the anode electrolyte in a mineral dissolution system operatively connected to the anode compartment to produce a mineral solution comprising divalent cations, un-reacted acid and the salt; and separating the salt and un-reacted acid from the mineral solution in a first mineral solution, and separating the divalent cations from the mineral solution in a second mineral solution using a nano-filtration system.

10. The method of claim 9 comprising producing hydroxide ions and/or bicarbonate ions and/or carbonate ions in the cathode electrolyte.

11. The method of claim 10, wherein the carbon dioxide added to the cathode electrolyte is contained in a waste gas from an industrial operation comprising an electrical power generating plant, a cement plant, an ore processing facility or a fermentation system.

12. The method of claim 11, wherein carbon dioxide in ambient air is excluded from the cathode electrolyte.

13. The method of claim 12, comprising maintaining a pH of between 8 and 11 in the cathode electrolyte.

14. The electrochemical system of claim 8, further comprising a reverse osmosis system operatively connected to the nano-filtration system and wherein the reverse osmosis system is configured to concentrate the salt and un-reacted acid in the first mineral solution to produce the anode electrolyte.

15. The electrochemical system of claim 14, wherein the reverse osmosis system is operatively connected to the anode compartment and wherein the reverse osmosis system is configured to replenish the anode electrolyte in the anode compartment.

16. The electrochemical system of claim 15, wherein the second mineral solution comprises calcium and/or magnesium ions.

17. The electrochemical system of claim 16, further comprising a carbonate precipitation system operatively connected to the nano-filtration system and to the cathode compartment, and wherein
the carbonate precipitation system is configured to receive cathode electrolyte from the cathode compartment and the second mineral solution from the nano-filtration system, and produce a carbonate and/or bicarbonate by mixing the waste gas with the cathode electrolyte and the second mineral solution.

18. The electrochemical system of claim 17, wherein the carbonate ad/or bicarbonate comprises calcium carbonate, calcium bicarbonate, magnesium carbonate and/or magnesium bicarbonate or a mixture thereof.

19. The electrochemical system of claim 18, further comprising a salt concentrator operatively connected to the anode compartment and configured to receive the anode electrolyte and concentrate the salt therein.

20. The electrochemical system of claim 19, wherein the anode comprises a gas diffusion anode.

21. The method of claim 13, comprising isolating the anode from the anode electrolyte using a second cation exchange membrane and migrating the hydrogen ions from through the second cation exchange membrane into the anode electrolyte.

22. The method of claim 21, comprising concentrating the first mineral solution by reverse osmosis to produce a concentrated first mineral solution and using the concentrated first mineral solution as the anode electrolyte.

23. The method of claim 22, comprising mixing the cathode electrolyte with the waste gas and the second mineral solution to produce a carbonate and/or bicarbonate comprising calcium and/or magnesium.

24. The method of claim 23, comprising withdrawing a portion of the anode electrolyte from the anode compartment, concentrating the withdrawn anode electrolyte by removing water, and returning the concentrated anode electrolyte to the anode compartment.

* * * * *

UNITED STATES PATENT AND TRADEMARK OFFICE
CERTIFICATE OF CORRECTION

PATENT NO. : 7,993,511 B2  
APPLICATION NO. : 12/617005  
DATED : August 9, 2011  
INVENTOR(S) : Gilliam et al.

Page 1 of 1

It is certified that error appears in the above-identified patent and that said Letters Patent is hereby corrected as shown below:

On the first page, in the figure at bottom of the page, please remove the line in the Nano-filtration box.

At sheet 9 of 11, figure 9, of the printed patent, please remove the line in the Nano-filtration box.

At column 24, line 33 (claim 9, line 1) of the printed patent, please change "an method" to --a method--.

Signed and Sealed this
Second Day of April, 2013

Teresa Stanek Rea
*Acting Director of the United States Patent and Trademark Office*